(12) United States Patent
Lv et al.

(10) Patent No.: US 12,539,638 B2
(45) Date of Patent: Feb. 3, 2026

(54) CUTTING TOOL

(71) Applicant: Nanjing Chervon Industry Co., Ltd., Nanjing (CN)

(72) Inventors: Hong Lv, Nanjing (CN); Sanwei Cui, Nanjing (CN); Shaojun Wang, Nanjing (CN); Shisheng Wang, Nanjing (CN); Sherwyn Lamer, Nanjing (CN); Terry Peters, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 255 days.

(21) Appl. No.: 18/330,474

(22) Filed: Jun. 7, 2023

(65) Prior Publication Data

US 2023/0398711 A1    Dec. 14, 2023

(30) Foreign Application Priority Data

Jun. 8, 2022  (CN) .......................... 202210640245.5
Apr. 14, 2023 (CN) .......................... 202310403197.2
Apr. 21, 2023 (CN) .......................... 202310436015.1

(51) Int. Cl.
 *B27B 9/02*  (2006.01)
(52) U.S. Cl.
 CPC ..................... *B27B 9/02* (2013.01)
(58) Field of Classification Search
 CPC .... B27B 9/02; B27B 9/00; B25F 5/02; B23D 47/00; B23D 47/126; B23D 45/16; B23D 47/12
 USPC .................................. 30/372, 390, 374, 376
 See application file for complete search history.

(56) References Cited

U.S. PATENT DOCUMENTS

| | | | |
|---|---|---|---|
| 5,570,511 A * | 11/1996 | Reich .................. | B27B 9/02 30/376 |
| 11,897,114 B1 * | 2/2024 | Wood .................. | H01M 50/247 |
| 2009/0064510 A1 * | 3/2009 | Niwa .................. | B27B 9/02 30/390 |
| 2010/0269353 A1 * | 10/2010 | Martin ................ | B27B 9/02 30/390 |
| 2011/0185581 A1 * | 8/2011 | Xing .................. | B25F 5/02 30/390 |
| 2012/0324742 A1 * | 12/2012 | Bau-Madsen ......... | B27B 9/02 83/13 |
| 2022/0063082 A1 | 3/2022 | Wang | |

(Continued)

FOREIGN PATENT DOCUMENTS

| CN | 1720123 B | 5/2012 |
|---|---|---|
| CN | 203091862 U | 7/2013 |
| CN | 206445291 U | 8/2017 |

(Continued)

*Primary Examiner* — Ghassem Alie
(74) *Attorney, Agent, or Firm* — Greenberg Traurig, LLP

(57) ABSTRACT

A cutting tool includes: a drive device for driving a saw blade to rotate; a base plate having an upper surface and a lower surface, wherein the lower surface is configured to abut against a cut material; a body accommodating at least part of the drive device and connected to the upper surface; a handle at least partially configured behind the body; and a junction portion for detachably mounting a battery set. When a cutting depth of the cutting tool is changed and a cutting angle of the cutting tool remains unchanged, a position of the handle relative to the base plate remains unchanged. The cutting tool is comfortable and convenient to use.

10 Claims, 34 Drawing Sheets

(56) References Cited

U.S. PATENT DOCUMENTS

2022/0161455 A1 * 5/2022 VanDaalwyk ............ B27B 9/02

FOREIGN PATENT DOCUMENTS

| | | | | |
|---|---|---|---|---|
| CN | 206500689 U | 9/2017 | | |
| CN | 214684527 U | 11/2021 | | |
| CN | 110732726 A | 2/2022 | | |
| CN | 216065805 U | 3/2022 | | |
| CN | 111372731 A | 5/2023 | | |
| DE | 102015101907 A1 * | 8/2016 | ............... | B27B 9/02 |
| DE | 102019116539 A1 * | 12/2019 | ............. | B23D 45/16 |

* cited by examiner

CUTTING TOOL

RELATED APPLICATION INFORMATION

This application claims the benefit under 35 U.S.C. § 119(a) of Chinese Patent Application No. 202210640245.5, filed on Jun. 8, 2022, Chinese Patent Application No. 202310403197.2, filed on Apr. 14, 2023, and Chinese Patent Application No. 202310436015.1, filed on Apr. 21, 2023, which applications are incorporated herein by reference in their entirety.

BACKGROUND

Cutting tools can cut various materials such as wood, fiberboard, and plastic through rotating toothed saw blades. A cutting tool generally includes a body and a base plate abutting against a cut material. A power saw is one type of cutting tool. In the power saw, a handle for a user to hold extends rearward relative to a body. The user generally machines workpieces at different cutting depths and cutting angles. However, for an existing cutting tool, when the user adjusts the cutting depth, the position of the handle changes greatly and the cutting tool is uncomfortable for the user to use.

SUMMARY

The present application provides a cutting tool. The cutting tool includes: a drive device for driving a saw blade to rotate; a base plate having an upper surface and a lower surface, where the lower surface is configured to abut against a cut material; a body accommodating at least part of the drive device and connected to the upper surface; a handle at least partially configured behind the body; and a junction portion for detachably mounting a battery set. When a cutting depth of the cutting tool is changed and a cutting angle of the cutting tool remains unchanged, a position of the handle relative to the base plate remains unchanged.

In some examples, the cutting tool includes a depth adjustment device for adjusting the cutting depth of the cutting tool, where the depth adjustment device includes a bracket pivotally mounted to the base plate to rotate about an angle axis, and when the cutting depth of the cutting tool is changed, the body moves relative to the bracket.

In some examples, the handle is fixedly connected to the bracket.

In some examples, the depth adjustment device includes a locking assembly configured to lock the cutting depth and disposed on a side of the handle facing the saw blade.

In some examples, when the cutting depth of the cutting tool is changed, the handle moves relative to the saw blade, and when the cutting angle of the cutting tool is changed, the handle is stationary relative to the saw blade.

In some examples, the bracket includes an extension extending substantially parallel to the base plate in a front and rear direction.

In some examples, the cutting tool includes a circuit board, where the handle is formed with an accommodation compartment in which at least part of the circuit board is configured substantially parallel to the base plate.

In some examples, the cutting tool includes a circuit board, where the handle is formed with an accommodation compartment, and at least part of the circuit board is configured above the drive device.

In some examples, the cutting tool includes a circuit board, where the bracket is configured to lower the temperature of the circuit board.

In some examples, the cutting tool includes a wire configured to conduct electricity and further includes a guide member for guiding at least part of the wire to move and a guide slot mating with the guide member, where the guide member covers at least part of the wire.

In some examples, the handle is formed with a guide structure, and at least part of the wire is arranged along the guide structure.

In some examples, the cutting tool includes a telescopic member with a variable effective dimension and configured to cover at least part of the wire.

In some examples, a difference between the height of a space occupied by the cutting tool when the cutting depth is a maximum cutting depth and the height of a space occupied by the cutting tool when the cutting depth is a minimum cutting depth is defined as an overall height difference, the cutting tool has a center of gravity, a difference between the height of the center of gravity of the cutting tool when the cutting depth is the maximum cutting depth and the height of the center of gravity of the cutting tool when the cutting depth is the minimum cutting depth is defined as a gravity height difference, and the ratio of the overall height difference to the gravity height difference is greater than or equal to 1.

In some examples, the handle includes a grip for a user to hold, the grip extends substantially along a ninth straight line, and the angle between the ninth straight line and a horizontal plane is less than or equal to 45°.

The present application further provides a cutting tool. The cutting tool includes: a drive device for driving a saw blade to rotate; a base plate having an upper surface and a lower surface, where the lower surface is configured to abut against a cut material; a body accommodating at least part of the drive device and connected to the upper surface; a handle at least partially configured behind the body; and a junction portion for detachably mounting a battery set. The handle is configured to rotate about an angle axis. The distance between the handle and the angle axis is fixed.

The present application further provides a cutting tool. The cutting tool includes: a drive device for driving a saw blade to rotate; a base plate having an upper surface and a lower surface, where the lower surface is configured to abut against a cut material; a body accommodating at least part of the drive device and connected to the upper surface; a handle at least partially configured behind the body; and a junction portion for detachably mounting a battery set. The handle is configured to rotate about an angle axis. When a cutting depth of the cutting tool is changed, the handle does not change with the saw blade relative to the base plate in position.

The present application further provides a cutting tool. The cutting tool includes: a drive device for driving a saw blade to rotate about a third axis; a base plate having an upper surface and a lower surface, where the lower surface is configured to abut against a cut material; a body accommodating at least part of the drive device and connected to the upper surface; a handle at least partially configured behind the body; and a junction portion for detachably mounting a battery set. The handle is movably connected to the body. The handle is configured to rotate about a fourth axis. The cutting tool further includes a locking mechanism having a locked state that makes the handle fixed relative to the base plate and a released state that allows the handle to move relative to the base plate.

In some examples, the fourth axis is substantially perpendicular to the third axis.

In some examples, the cutting tool further includes a first limiting mechanism configured to limit an angle by which the handle rotates about the fourth axis.

In some examples, the first limiting mechanism restricts the angle by which the handle rotates about the fourth axis to being greater than or equal to 0° and less than or equal to 180°.

In some examples, the cutting tool further includes a connecting mechanism configured to connect the handle to the body, where the connecting mechanism is configured to be hollow.

In some examples, the fourth axis is substantially parallel to the third axis.

In some examples, the cutting tool further includes a second limiting mechanism configured to limit an angle by which the handle rotates about the fourth axis.

In some examples, the second limiting mechanism restricts the angle by which the handle rotates about the fourth axis to being greater than or equal to 0° and less than or equal to 35°.

The present application further provides a cutting tool. The cutting tool includes: a drive device for driving a saw blade to rotate; a base plate having an upper surface and a lower surface, where the lower surface is configured to abut against a cut material; a body accommodating at least part of the drive device and connected to the upper surface; a handle at least partially configured behind the body; and a junction portion for detachably mounting a battery set. The body is movably connected to the base plate, and the handle is fixedly connected to the base plate.

In some examples, the junction portion is fixedly connected to the body.

In some examples, the junction portion is fixedly connected to the handle.

In some examples, the handle includes a first grip, the lower surface is defined as a second plane, the first grip extends substantially along an eighth straight line, and the angle between the eighth straight line and the second plane is greater than or equal to 0° and less than or equal to 45°.

The present application further provides a cutting tool. The cutting tool includes: a drive device for driving a saw blade to rotate about a third axis; a base plate having an upper surface and a lower surface, where the lower surface is configured to abut against a cut material; a body accommodating at least part of the drive device and connected to the upper surface; a handle at least partially configured behind the body; and a junction portion for detachably mounting a battery set. The handle is movably connected to the body. The handle is configured to rotate about a fourth axis. The cutting tool further includes a locking mechanism having a locked state that makes the handle fixed relative to the base plate and a released state that allows the handle to move relative to the base plate.

In some examples, the fourth axis is substantially perpendicular to the third axis.

In some examples, the cutting tool further includes a first limiting mechanism configured to limit an angle by which the handle rotates about the fourth axis.

In some examples, the first limiting mechanism restricts the angle by which the handle rotates about the fourth axis to being greater than or equal to 0° and less than or equal to 180°.

In some examples, the cutting tool further includes a connecting mechanism configured to connect the handle to the body, where the connecting mechanism is configured to be hollow.

In some examples, the fourth axis is substantially parallel to the third axis.

In some examples, the cutting tool further includes a second limiting mechanism configured to limit an angle by which the handle rotates about the fourth axis.

In some examples, the second limiting mechanism restricts the angle by which the handle rotates about the fourth axis to being greater than or equal to 0° and less than or equal to 35°.

The present application further provides a cutting tool. The cutting tool includes: a drive device for driving a saw blade to rotate; a base plate having an upper surface and a lower surface, where the lower surface is configured to abut against a cut material; a body accommodating at least part of the drive device and connected to the upper surface; a handle at least partially configured behind the body; and a junction portion for detachably mounting a battery set. The body is movably connected to the base plate, and the handle is fixedly connected to the base plate.

In some examples, the junction portion is fixedly connected to the body.

In some examples, the junction portion is fixedly connected to the handle.

In some examples, the handle includes a first grip, the lower surface is defined as a second plane, the first grip extends substantially along an eighth straight line, and the angle between the eighth straight line and the second plane is greater than or equal to 0° and less than or equal to 45°.

The present application provides a cutting tool. The cutting tool includes: a drive device for driving a saw blade to rotate; a base plate having an upper surface and a lower surface, where the lower surface is configured to abut against a cut material; a body accommodating at least part of the drive device and connected to the upper surface; a handle at least partially configured behind the body; and a junction portion for detachably mounting a battery set. At least part of the battery set is disposed above the drive device. The lower surface is defined as a second plane, and a projection of the battery set on the second plane at least partially overlaps a projection of the drive device on the second plane.

In some examples, the saw blade is defined as a first plane, the battery set is configured to be mounted to the junction portion along a second straight line, the second straight line is substantially parallel to the first plane, and an angle is formed between the second straight line and the second plane.

In some examples, the angle is greater than or equal to 30° and less than or equal to 75°.

In some examples, the angle is greater than or equal to 45° and less than or equal to 60°.

In some examples, the junction portion includes a mounting surface erected relative to the base plate, and the mounting surface extends in a manner of being substantially perpendicular to the first plane.

In some examples, the cutting tool has a forwardmost end and a rearmost end, where the distance from the forwardmost end to the rearmost end is greater than or equal to 400 mm and less than or equal to 480 mm.

In some examples, the cutting tool has a highest point and a lowest point, where the distance from the highest point to the lowest point is greater than or equal to 190 mm and less than or equal to 240 mm.

In some examples, the battery set has a voltage of greater than or equal to 18 V and less than or equal to 60 V.

In some examples, the weight of the cutting tool is greater than or equal to 3.8 kg and less than or equal to 4.8 kg.

In some examples, the cutting tool includes a secondary handle including a second grip configured for a user to hold, where the second grip is enclosed by a grip space for receiving a palm of the user, and a dimension of the grip space in a thickness direction of the palm of the user is greater than or equal to 20 mm and less than or equal to 120 mm.

The present application further provides a cutting tool. The cutting tool includes: a drive device for driving a saw blade to rotate; a base plate having an upper surface and a lower surface, where the lower surface is configured to abut against a cut material; a body accommodating at least part of the drive device and connected to the upper surface; a handle at least partially configured behind the body; and a junction portion for detachably mounting a battery set. The saw blade is defined as a first plane; the battery set is configured to be mounted to the junction portion along a first straight line; and the saw blade has a vertical cutting state where the saw blade is substantially perpendicular to the base plate, where in the vertical cutting state, the first plane forms an angle with the first straight line, and the angle is greater than or equal to 0° and less than or equal to 85°.

In some examples, the angle is greater than or equal to 15° and less than or equal to 75°.

In some examples, the angle is greater than or equal to 30° and less than or equal to 60°.

In some examples, the junction portion includes a mounting surface erected relative to the base plate, and the mounting surface extends in a manner of obliquely intersecting the first plane.

In some examples, the junction portion includes a guide mechanism extending on the mounting surface, where the guide mechanism is configured to engage with the battery set.

In some examples, the base plate includes a front end and a rear end, and the handle includes a first grip configured for a user to hold, where at least part of the first grip protrudes behind the rear end.

The present application further provides a cutting tool. The cutting tool includes: a drive device for driving a saw blade to rotate; a base plate having an upper surface and a lower surface, where the lower surface is configured to abut against a cut material; a body accommodating at least part of the drive device and connected to the upper surface; a handle at least partially configured behind the body; and a junction portion for detachably mounting a battery set. The junction portion includes an opening portion opening in a direction away from the saw blade in a left and right direction; and a mounting surface extending substantially parallel to the base plate and configured below the battery set. The lower surface is defined as a second plane, and a projection of the battery set on the second plane at least partially overlaps a projection of the mounting surface on the second plane.

In some examples, the junction portion includes a guide mechanism extending on the mounting surface, where the guide mechanism is configured to engage with the battery set.

In some examples, the distance between the mounting surface and the upper surface is greater than or equal to 10 mm and less than or equal to 40 mm.

In some examples, the junction portion includes a front wall configured in the front of the junction portion; a rear wall configured in the rear of the junction portion and behind the front wall; and a lower wall configured at the bottom of the junction portion, where at least part of the lower wall is located between the front wall and the rear wall in a front and rear direction; and the front wall, the rear wall, and the lower wall extend away from the saw blade in the left and right direction and define the opening portion.

In some examples, the junction portion includes a reinforcement mechanism configured to increase the strength of the junction portion.

In some examples, the reinforcement mechanism includes a reinforcement rib configured at the top of the junction portion.

In some examples, the junction portion includes a window portion opening upward.

DETAILED DESCRIPTION

Figure 1:
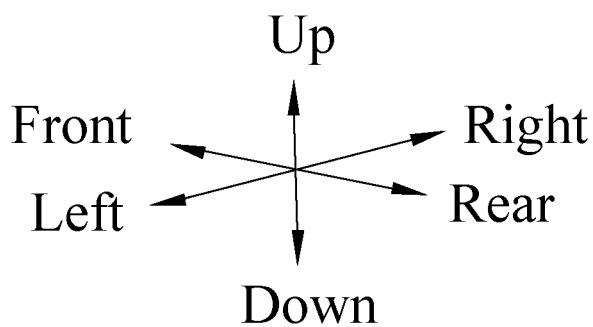
FIG. 1 is a perspective view of a cutting tool according to an example of the present application.
Figure 1:
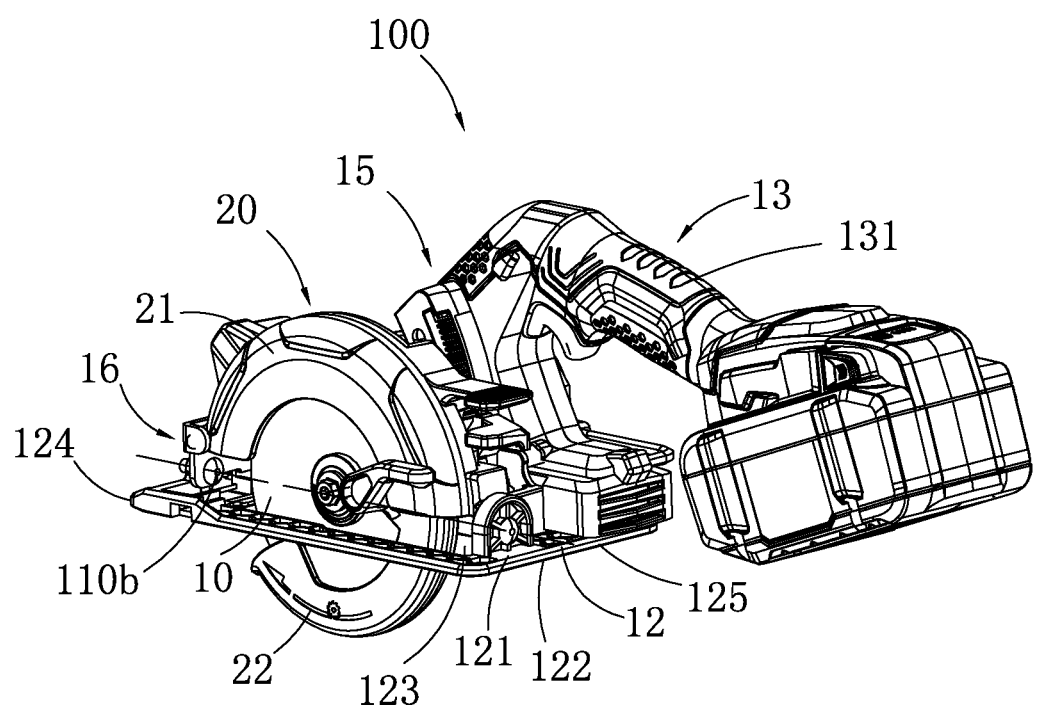
Figure 2:
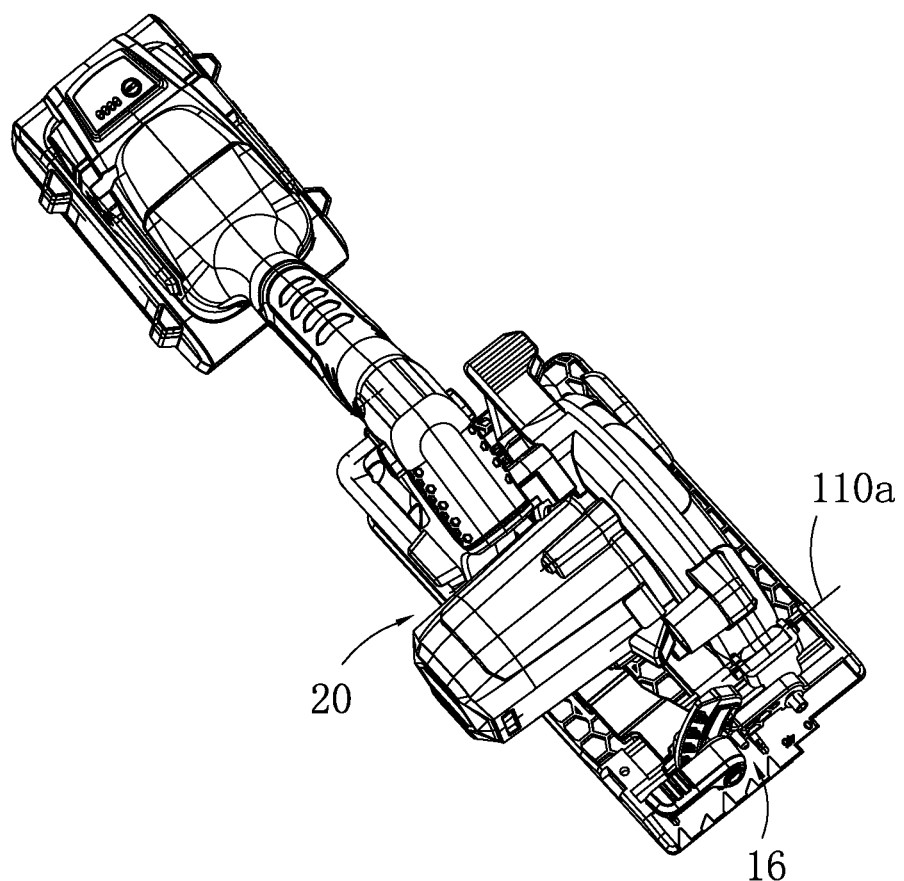
FIG. 2 is a perspective view of the cutting tool of FIG. 1 from another angle.

The present application is described below in detail in conjunction with drawings and examples. A cutting tool 100 shown in FIG. 1 may be used for a user to perform a cutting operation. For ease of description, an up and down direction, a left and right direction, and a front and rear direction as shown in FIG. 1 are defined in this example. In the following description, a travelling direction for cutting is used as the front, and the direction towards the user is used as the rear. As for the left and right directions of a component and a structure, the left and right directions of the user when using the cutting tool 100 are used for reference.

As shown in FIGS. 1 to 4, the cutting tool 100 in this example mainly includes a drive device 11, a base plate 12, a body 20, and a handle 13. The drive device 11 drives a saw blade 10 to rotate to operate on a cut material (not shown), and the rotating saw blade 10 can cut a workpiece or cut a groove on the workpiece. In this example, the saw blade 10 is disc-shaped, and the drive device 11 is an electric motor 111. The electric motor 111 includes a motor shaft 112 drivingly connected to the saw blade 10. When the motor shaft 112 rotates, the saw blade 10 is driven by the motor shaft 112 to rotate. The base plate 12 has an upper surface 121 and a lower surface 122, where the lower surface 122 is configured to abut against the cut material. In a cutting process, the lower surface 122 is in contact with the cut material to support the cutting tool 100 and position the cutting tool 100 on the cut material. The body 20 accommodates at least part of the drive device 11 and is connected to the upper surface 121. The body 20 includes a first shield 21 and a second shield 22. The first shield 21 encloses an upper half of the saw blade 10. The second shield 22 rotatably encloses part of the structure of a lower half of the saw blade 10. The base plate 12 is formed with a slot portion 123 substantially rectangular, where a long side of the slot portion 123 extends in the front and rear direction, and the slot portion 123 is used for part of the second shield 22 and part of the saw blade 10 to pass through. The body 20 is formed with an accommodation cavity 23a configured to accommodate the electric motor 111. The handle 13 is at least partially configured behind the body 20. In some examples, the cutting tool 100 also includes a secondary handle 14. The secondary handle 14 is at least partially configured in front of the handle 13. In some examples, the handle 13 includes a first grip 131 configured for the user to hold. When using the cutting tool 100, the user holds the first grip 131 to stably operate the cutting tool 100. The base plate 12 includes a front end 124 and a rear end 125. The rear end 125 is located behind the front end 124, and the length from the front end 124 to the rear end 125 is a length by which the base plate 12 extends in the front and rear direction. At least part of the first grip 131 protrudes behind the rear end 125.

The cutting tool 100 also includes a junction portion 30 configured for detachably mounting a battery set 90. The battery set 90 provides a power source for the cutting tool 100. One or more battery sets 90 may be provided. The junction portion 30 encloses a battery compartment 31 configured to accommodate at least part of the battery set 90. In some examples, an energy source of the cutting tool 100 may be obtained through the connection of a grid or the addition of fuel.

The cutting tool 100 also includes a depth adjustment device 15 for adjusting an angle by which the body 20 pivots relative to the base plate 12 about a depth axis 110a. The first shield 21, the second shield 22, and the saw blade 10 can synchronously pivot relative to the base plate 12 about the depth axis 110a. When the user adjusts the angle by which the body 20 pivots relative to the base plate 12 about the depth axis 110a, a dimension of the saw blade 10 protruding from the lower surface 122, that is, a cutting depth of the cutting tool 100, is adjusted. The cutting tool 100 also includes an angle adjustment device 16 for changing a cutting angle of the saw blade 10. The first shield 21, the second shield 22, and the saw blade 10 can synchronously pivot relative to the base plate 12 about an angle axis 110b. When the user adjusts an angle by which the body 20 pivots relative to the base plate 12 about the angle axis 110b, an angle at which the saw blade 10 is inclined relative to the base plate 12, that is, a cutting angle of the cutting tool 100, is adjusted.

When the cutting depth of the cutting tool 100 is changed and the cutting angle of the cutting tool 100 remains unchanged, the position of the handle 13 relative to the base plate 12 remains unchanged. The handle 13 is configured to rotate about the angle axis 110b and not configured to rotate about the depth axis 110a. When the cutting angle of the cutting tool 100 is changed, the handle 13 rotates about the angle axis 110b and moves relative to the base plate 12. However, no matter whether the cutting angle of the cutting tool 100 has been changed, the position of the handle 13 relative to the base plate 12 is unchanged when the cutting depth of the cutting tool 100 is changed. When the cutting depth of the cutting tool 100 is changed, the body 20 moves relative to the base plate 12, and the position of the handle 13 relative to the base plate 12 is unchanged so that the handle 13 moves relative to the saw blade 10. When the cutting angle of the cutting tool 100 is changed, the body 20 moves with the handle 13 so that the handle 13 is stationary relative to the saw blade 10. With the structure improved, the cutting tool is convenient for the user to operate and comfortable to use.

As shown in FIGS. 5 to 8, in this example, the depth adjustment device 15 includes a bracket 151. The bracket 151 is pivotally mounted to the base plate 12 to rotate relative to the base plate 12 about the angle axis 110b. The body 20 is movably connected to the bracket 151, and the handle 13 is fixedly connected to the bracket 151. When the body 20 rotates as a whole relative to the base plate 12 about the depth axis 110a, that is, when the cutting depth of the cutting tool 100 is changed, the bracket 151 is stationary relative to the base plate 12, the handle 13 is stationary relative to the bracket 151, and the position of the handle 13 relative to the base plate 12 is unchanged. When the body 20 rotates relative to the base plate 12 about the angle axis 110b, the bracket 151 rotates relative to the base plate 12 about the angle axis 110b, and the handle 13 is stationary relative to the bracket 151 and rotates relative to the base plate 12 about the angle axis 110b.

The distance between the handle 13 and the angle axis 110b is the distance between a point P on the handle and the angle axis 110b. When the cutting depth of the cutting tool 100 is changed, the distance between the point P on the handle and the angle axis 110b is fixed. The point P on the handle 13 is a physical point on the handle 13, and the specific position of the point P on the handle 13 is not limited. The handle 13 rotates about the angle axis 110b at a radius of rotation, that is, the distance between the point P on the handle 13 and the angle axis 110b is the length of a radius of rotation of the point P on the handle 13 about the angle axis 110b. The handle 13 is fixedly connected to the bracket 151. When the user changes the cutting depth of the cutting tool 100, the position of the handle 13 relative to the base plate 12 is unchanged, and the user can comfortably hold the handle 13. In some examples, part of the handle 13 is fixedly connected to the base plate 12. When the cutting angle of the cutting tool 100 is changed, part of the handle 13 moves relative to the base plate 12 and another part of the handle 13 is fixed relative to the base plate 12.

When the user adjusts the cutting depth of the cutting tool 100, the position of the handle 13 relative to the base plate 12 is unchanged, and the user always holds the handle 13 at the same position. At this position, the user pushes the cutting tool 100 most comfortably and effortlessly. When the user changes the cutting angle of the cutting tool 100, the height of the handle 13 relative to the base plate 12 changes little. When the user adjusts the cutting depth after adjusting the cutting angle, the position of the handle 13 relative to the base plate 12 is unchanged, and the user can still hold the handle 13 at an ergonomic position to perform cutting. In this manner, the position of the handle 13 changes little and the handle 13 is convenient for the user to hold easily and effortlessly, which is ergonomic and safe to use. The handle 13 includes a grip for the user to hold, the grip extends substantially along a ninth straight line 99, and an angle R between the ninth straight line 99 and a horizontal plane is less than or equal to 45°. In some examples, the angle R between the ninth straight line 99 and the horizontal plane is less than or equal to 80°. In some examples, the angle R between the ninth straight line 99 and the horizontal plane is less than or equal to 40°. In some examples, the angle R between the ninth straight line 99 and the horizontal plane is less than or equal to 35°. In some examples, the angle R between the ninth straight line 99 and the horizontal plane is less than or equal to 30°.

In this example, the cutting tool 100 includes a fixing block 195 protruding from the upper surface 121 of the base plate 12. The fixing block 195 is mounted onto the base plate 12 by a screw and supports the bracket 151. The bracket 151 is rotatably connected to the fixing block 195 by a rivet to be rotatably connected to the base plate 12. One or more fixing blocks 195 may be provided. In this example, two fixing blocks 195 are provided, and the two fixing blocks 195 are connected to the bracket 151 separately to pivotally support the bracket 151. The bracket 151 includes an extension 153 and a support 152. The extension 153 extends substantially parallel to the base plate 12 in the front and rear direction. Two ends of the extension 153 in the front and rear direction abut against the fixing blocks 195 respectively and are positioned by rivets. In this example, two slot portions 123 are provided. Part of the extension 153 passes through a slot portion 123 away from the saw blade 10 to be flush with the lower surface 122, and the length of the extension 153 in the front and rear direction is greater than the length of the slot portion 123 in the front and rear direction. In this manner, the bracket 151 has a better support capability. The support 152 is configured to support the handle 13. The support 152 extends upward substantially vertically relative to the base plate 12. In this example, the support 152 is fixedly connected to the handle 13 by screws. A material of the bracket 151 may be a metal, an alloy, a composite material, or the like. In this example, the material of the bracket 151 is the metal. The bracket 151 includes the extension 153 so that the strength of the bracket 151 is enhanced and the stability of the cutting tool 100 is improved.

Figure 5:
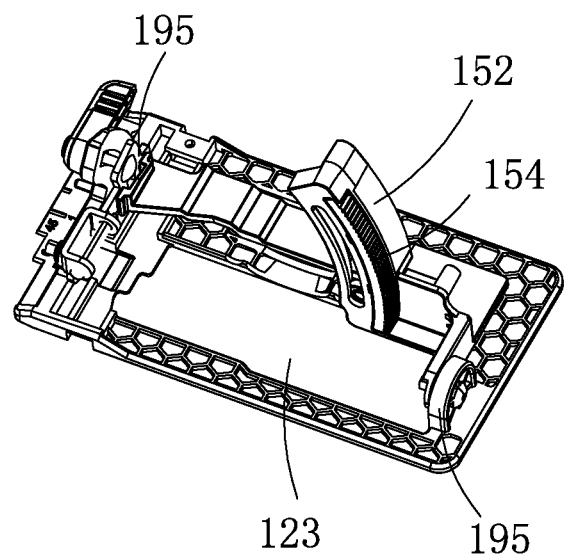
FIG. 5 is a perspective view of a base plate and a bracket of the cutting tool in FIG. 1.
Figure 6:
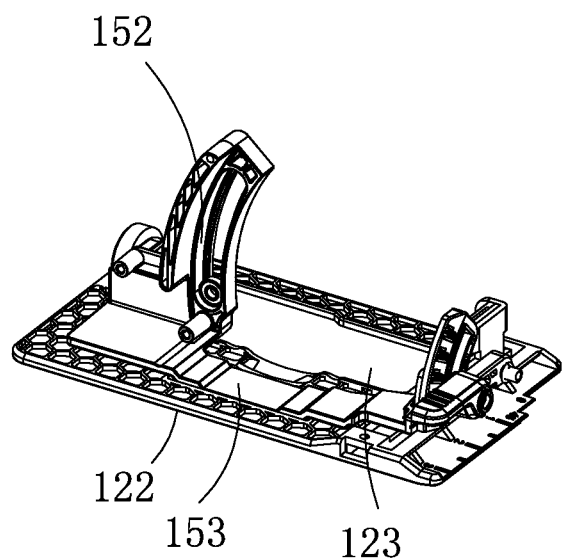
FIG. 6 is a perspective view of a base plate and a bracket of the cutting tool of FIG. 1 from another angle.
Figure 7:
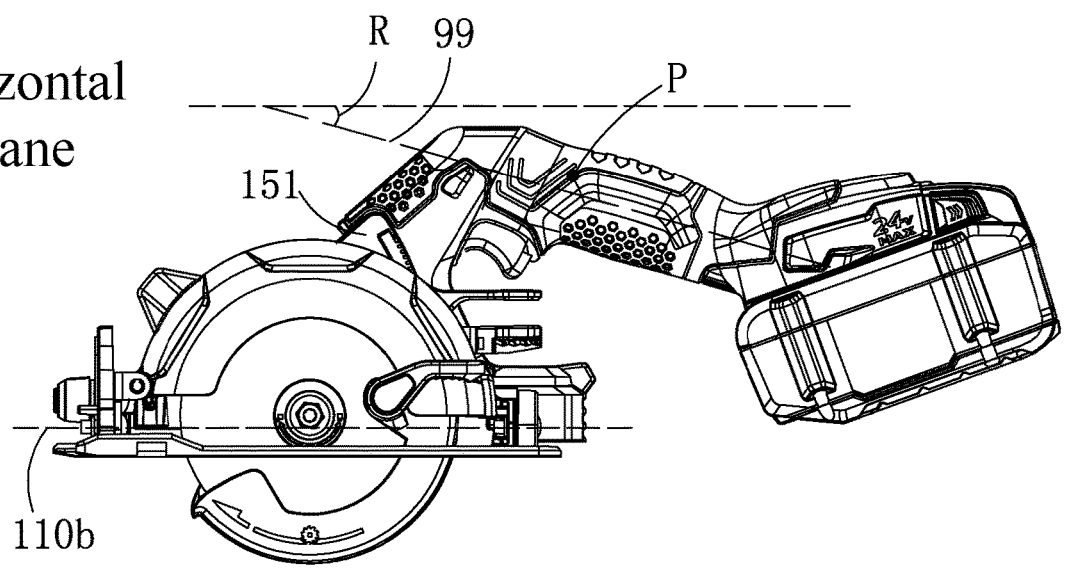
FIG. 7 is a left view of the cutting tool in FIG. 1.
Figure 8:
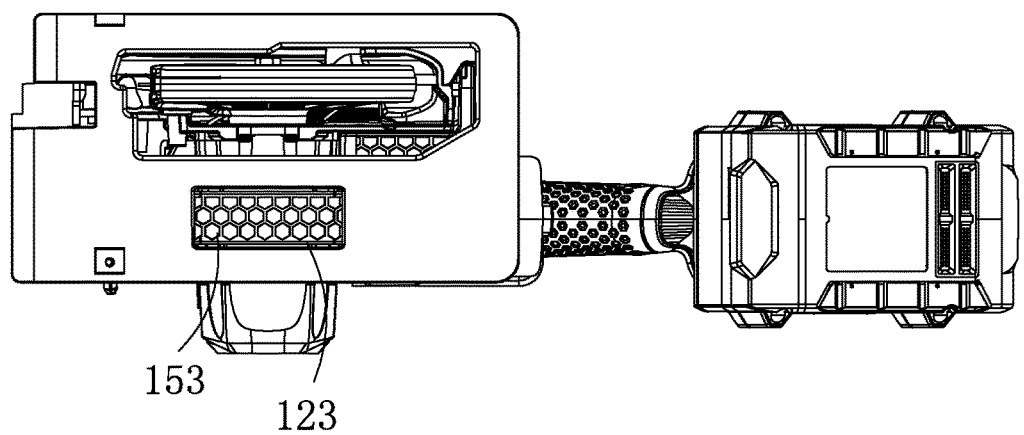
FIG. 8 is a bottom view of the cutting tool in FIG. 1.
Figure 9:
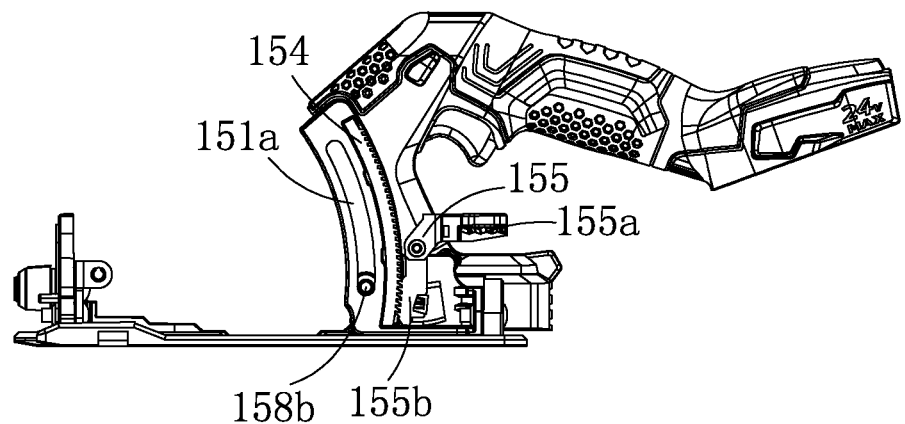
FIG. 9 is a left view of a base plate, a bracket, and a handle of the cutting tool of FIG. 1 with no battery set installed.

As shown in FIGS. 5, 6, and 9, the depth adjustment device 15 includes a locking assembly. The locking assembly is disposed on a side of the handle 13 facing the saw blade 10. The locking assembly includes a first locking member 154 and a second locking member 155. The second locking member 155 has a meshed state and a released state. In the meshed state, the second locking member 155 at least partially meshes with the first locking member 154. In the released state, the second locking member 155 is disengaged from the first locking member 154. Before the user adjusts the cutting depth by using the depth adjustment device 15, the second locking member 155 at least partially meshes with the first locking member 154, the second locking member 155 is in the meshed state, and the second locking member 155 is substantially stationary relative to the first locking member 154. When the user adjusts the cutting depth by using the depth adjustment device 15, the second locking member 155 is disengaged from the first locking member 154, the second locking member 155 is in the released state, and the second locking member 155 can move relative to the first locking member 154. When the second locking member 155 is in the meshed state, the cutting depth of the cutting tool 100 is locked, and the user can perform the cutting operation on the cut material at a set cutting depth. When the second locking member 155 is in the released state, the user may set the cutting depth of the cutting tool 100 by adjusting a position of the second locking member 155 relative to the first locking member 154. The position of the second locking member 155 relative to the first locking member 154 is changed so that the cutting depth of the cutting tool 100 is changed, which is simple in structure and easy and convenient to operate. In this example, the first locking member 154 is a rack. The rack is fixedly mounted on a side of the support 152 facing the second locking member 155. An elastic member is provided between the rack and the support 152. A tooth tip of the rack is arc-shaped. The elastic member and the arc-shaped tooth tip make the second locking member 155 and the first locking member 154 mesh more smoothly and closely.

Figure 3:
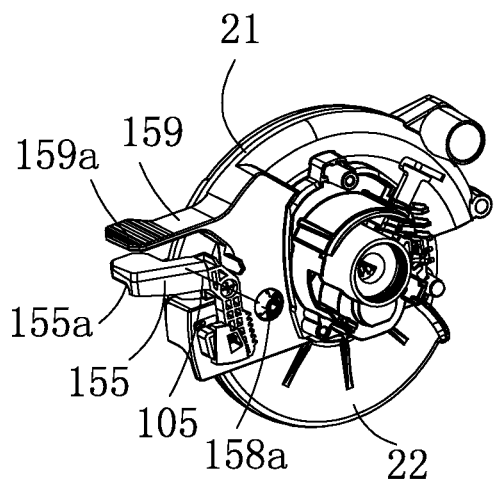
FIG. 3 is a perspective view of a first shield and a second shield of a body of the cutting tool in FIG. 1.
Figure 4:
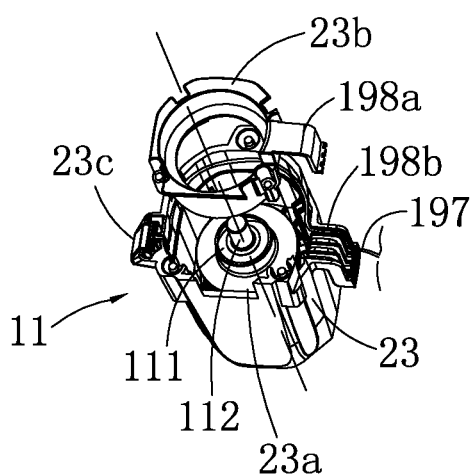
FIG. 4 is an exploded view of a drive device of the cutting tool in FIG. 1.

As shown in FIGS. 3 and 9, the second locking member 155 is pivotally mounted to the first shield 21 and movably connected to the first shield 21. The second locking member 155 is configured to pivot about a fifth axis 105. The first shield 21 is formed with a first operating member 159 including a first operating portion 159a. The second locking member 155 includes a second operating portion 155a, and the first operating portion 159a and the second operating portion 155a are pressed by fingers of the user. When the user presses the first operating portion 159a and the second operating portion 155a, the second operating portion 155a rotates towards the first operating portion 159a, and the position of the first operating member 159 is unchanged. The second locking member 155 includes a meshing portion 155b configured to mesh with the rack, and the first shield 21 is formed with a guide rib for guiding the meshing portion 155b to rotate.

The depth adjustment device 15 also includes a rolling assembly 158. The rolling assembly 158 is rollably connected to the first shield 21 and the bracket 151. The rolling assembly 158 includes a fixed member 158a and a rolling member 158b, where the fixed member 158a is disposed on the first shield 21 and the rolling member 158b is sleeved on the fixed member 158a. The rolling member 158b can rotate on the fixed member 158a. The bracket 151 includes a pivot slot 151a for the rolling member 158b to pass through. The width of the pivot slot 151a is always consistent in a length direction of the pivot slot 151a, and a dimension of the rolling member 158b is configured to be larger than the width of the pivot slot 151a. The pivot slot 151a is substantially arc-shaped. When the cutting depth is changed, the rolling member 158b moves with the first shield 21. The pivot slot 151a includes a first end and a second end. When the rolling member 158b abuts against the first end or the second end, the rolling member 158b does not allow the first shield 21 to continue rotating. The rolling member 158b is a bearing. In this manner, the user performs depth adjustment smoothly, stably, and with high accuracy, which has a low requirement on the manufacturing accuracy of parts. The dimension of the rolling member 158b is larger than the width of the pivot slot 151a, and the first locking member 154 may mesh with the second locking member 155 so that during angle adjustment, the bracket 151 can pivot with the first shield 21.

Figure 10:
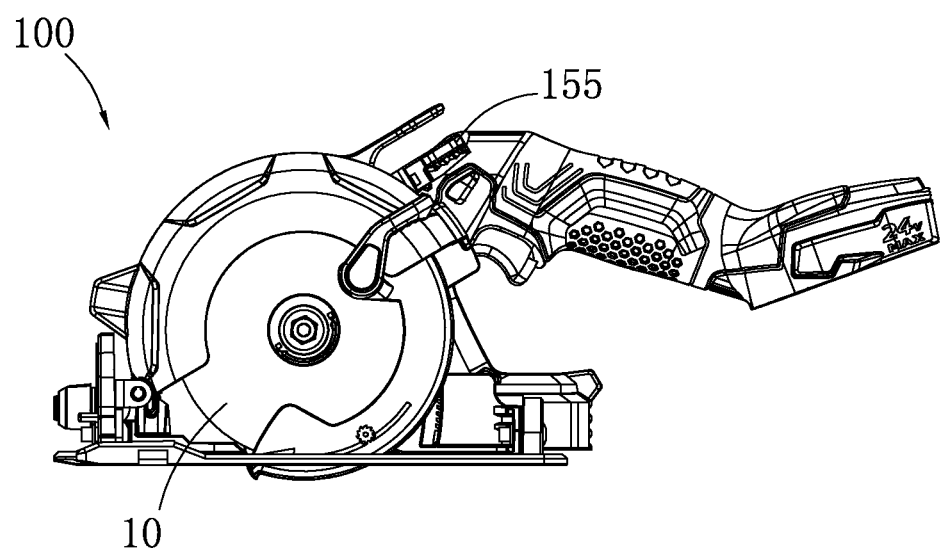
FIG. 10 is a left view of the cutting tool of FIG. 1 having a minimum cutting depth and with no battery set installed.
Figure 11:
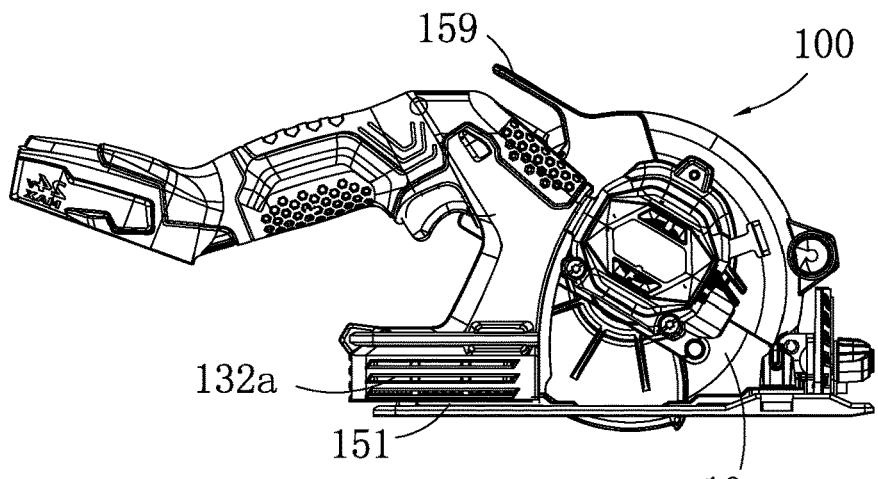
FIG. 11 is a right view of the cutting tool of FIG. 1 having a minimum cutting depth and with no battery set installed.
Figure 15:
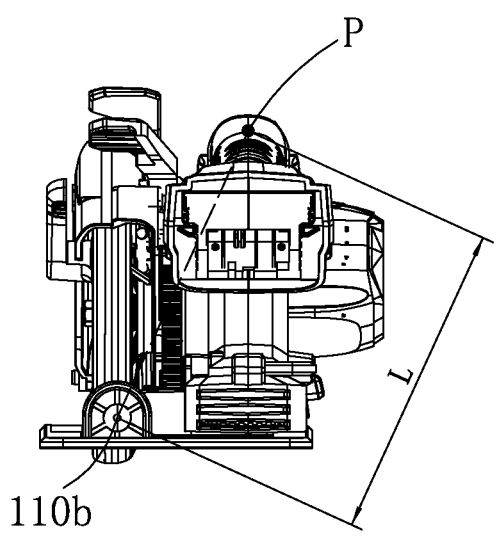
FIG. 15 is a rear view of the cutting tool of FIG. 1 having a minimum cutting depth and with no battery set installed.
Figure 16:
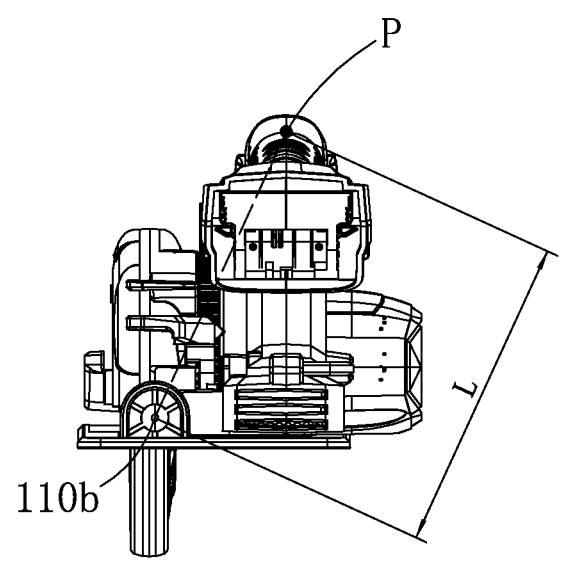
FIG. 16 is a rear view of the cutting tool of FIG. 1 having a maximum cutting depth and with no battery set installed.

As shown in FIGS. 1 and 16, the cutting tool 100 has a maximum cutting depth. The dimension of the saw blade 10 protruding from the lower surface 122 is the largest. As shown in FIGS. 10, 11, and 15, the cutting tool has a minimum cutting depth. The dimension of the saw blade 10 protruding from the lower surface 122 is the smallest. A difference between the height of a space occupied by the cutting tool 100 when the cutting depth is the maximum cutting depth and the height of a space occupied by the cutting tool 100 when the cutting depth is the minimum cutting depth is defined as an overall height difference. The cutting tool 100 has a center of gravity. A difference between the height of the center of gravity of the cutting tool 100 when the cutting depth is the maximum cutting depth and the height of the center of gravity of the cutting tool 100 when the cutting depth is the minimum cutting depth is defined as a gravity height difference. The ratio of the overall height difference to the gravity height difference is greater than or equal to 1. In some examples, the ratio of the overall height difference to the gravity height difference is greater than or equal to 1 and less than or equal to 10. In some examples, the ratio of the overall height difference to the gravity height difference is greater than or equal to 1 and less than or equal to 5. In this manner, when the user adjusts the cutting depth, even if the cutting depth changes greatly and the position of the handle 13 is unchanged, the position of the center of gravity can change little so that the user has a good feeling of use and the whole machine has a good balance. The distance between the handle 13 and the angle axis 110b is defined as the distance L between the point P on the handle and the angle axis 110b. As shown in FIGS. 15 and 16, the distance L has the same length when the cutting tool 100 has the minimum cutting depth and when the cutting tool 100 has the maximum cutting depth. The length of the distance L remains unchanged when the cutting tool 100 has any cutting depth between the minimum cutting depth and the maximum cutting depth.

As shown in FIGS. 4 and 11 to 13, the cutting tool 100 includes a circuit board 196 and a wire 197. The wire 197 is used for conducting electricity. The wire 197 connects the circuit board 196 to the drive device 11. The wire 197 also connects the circuit board to the battery set 90. The cutting tool 100 includes a lighting device. The wire 197 also connects the drive device to the lighting device. All conductive lines in the cutting tool 100 are considered as the wire 197. In this example, the handle 13 includes a mounting portion 132, and the mounting portion 132 is formed with an accommodation compartment 133 configured to accommodate the circuit board 196. In this example, the circuit board 196 is configured substantially parallel to the base plate 12 in the accommodation compartment 133. The circuit board 196 is disposed in the accommodation compartment 133. In this manner, the space in the accommodation compartment 133 is fully utilized, and the structure is compact, which facilitates the arrangement of the wire 197 and the natural heat dissipation of the circuit board 196. The mounting portion 132 includes a heat dissipation vent 132a for dissipating heat of the circuit board 196. The heat dissipation vent 132a is a through slot formed on the mounting portion 132. Multiple heat dissipation vents 132a may be provided, or the heat dissipation vent 132a may be arranged at multiple positions. In this example, the heat dissipation vent 132a is disposed around the bottom, left, right, and rear of the circuit board 196 and can dissipate heat omnidirectionally. The bracket 151 is in direct contact with the circuit board 196 through the heat dissipation vent 132a disposed at the bottom and to the left of the circuit board 196. Since the bracket 151 is made of a metal material, the bracket 151 has high strength and a good heat conduction effect. The bracket 151 is in direct contact with the circuit board 196 so that the heat of the circuit board 196 can be transferred to the bracket 151 and dissipated more quickly.

A guide structure 132b is formed in the accommodation compartment 133, and at least part of the wire 197 is arranged along the guide structure 132b. The guide structure 132b is designed in a labyrinth shape to fix the wire 197 through friction. The body 20 includes a motor housing 23 formed with the accommodation cavity 23a, and the drive device 11 is accommodated in the accommodation cavity 23a. The motor housing 23 includes a motor cover 23b for guiding wind and fixing the electric motor 111. The cutting tool 100 includes a guide member 198. The guide member 198 includes a first guide member 198a and a second guide member 198b.

The motor cover 23b is formed with the first guide member 198a protruding from the motor cover 23b. The motor housing 23 is formed with the second guide member 198b protruding from the motor housing 23. The first guide member 198a and the second guide member 198b are formed with respective grooves for the wire 197 to pass through. When the motor cover 23b is mounted onto the motor housing 23, the grooves on the first guide member 198a and the second guide member 198b mate with each other and form a passage. The wire 197 is accommodated in the passage. Since the motor cover 23b is press-fitted in the motor housing 23, the first guide member 198a can press the wire 197 towards the second guide member 198b. Part of the wire 197 is fixed in the passage formed by the first guide member 198a and the second guide member 198b, and the position of this part is fixed so that the wire is not easily damaged during movement, and the service life of the wire is improved. The motor housing 23 is formed with a lamp accommodation portion 23c. A lamp is accommodated in the lamp accommodation portion 23c to illuminate the workpiece and indicate a cutting path. The lamp is disposed on the motor housing 23, achieving a compact structure. In this example, the first guide member 198a and the second guide member 198b form four passages for accommodating three-phase wires 197 of the electric motor and a wire 197 of the lamp, respectively. The lamp is specifically a light-emitting diode (LED) lamp. In this manner, two ends of the wire 197 are fixedly connected to the circuit board 196 and the drive device 11, separately. When the user performs the depth adjustment, wires 197 can be arranged neatly, so as to protect the wires 197 from damage.

Figure 12:
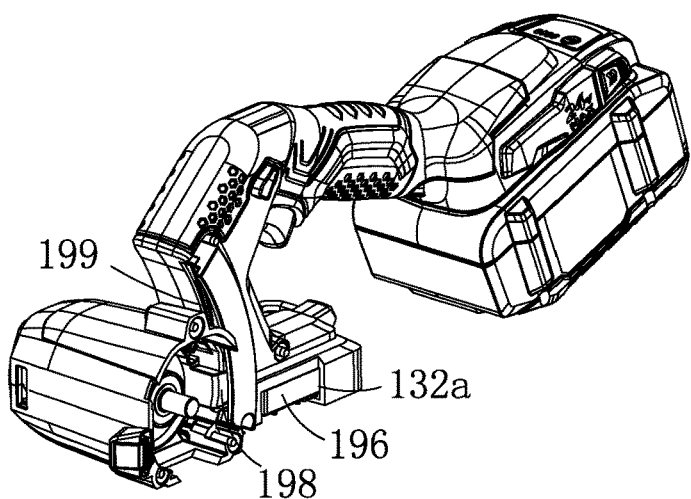
FIG. 12 is a perspective view of a drive device and a handle of the cutting tool in FIG. 1.
Figure 13:
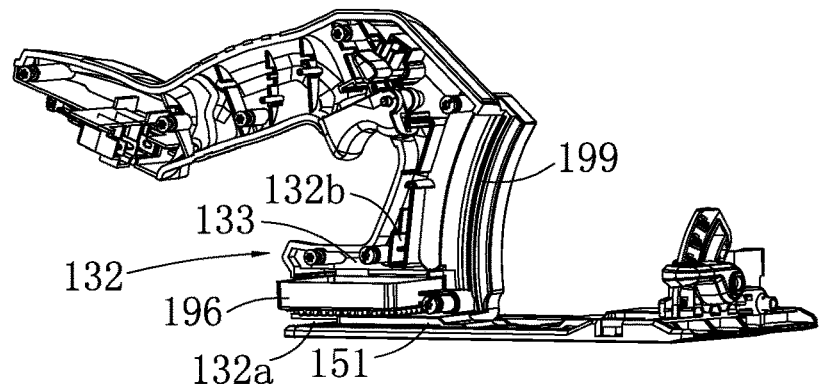
FIG. 13 is a perspective view of a base plate, a bracket, a circuit board, and part of a handle of the cutting tool of FIG. 1 with no battery set installed.
Figure 14:
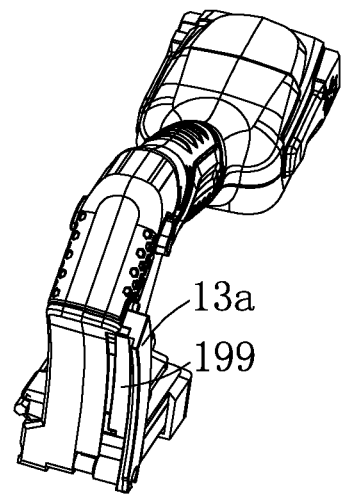
FIG. 14 is a perspective view of a handle of the cutting tool of FIG. 1 with no battery set installed.

As shown in FIGS. 12 to 14, the cutting tool 100 includes a guide slot 199. The guide member 198 guides at least part of the wire 197 to move, and the guide slot 199 is configured to mate with the guide member 198. The guide member 198 covers part of the wire 197 so that the wire 197 is invisible when observed from the right. The handle includes a bracket mounting portion 13a. The guide slot 199 is formed on a side of the handle 13 facing away from the bracket mounting portion 13a and extends substantially vertically relative to the base plate 12 along an edge of the handle 13. The guide slot 199 is substantially arc-shaped. The guide slot 199 is configured for the guide member 198 to slide up and down. When the user adjusts the cutting depth of the cutting tool 100, the body 20 and the electric motor 111 rotate relative to the base plate 12 about the depth axis 110a. The guide member 198 rotates with the body 20 relative to the base plate 12 about the depth axis 110a, and an end of the wire 197 rotates with the electric motor 111 relative to the base plate 12 about the depth axis 110a. The guide member 198 covers the end of the wire 197 and slides under the guide of the guide slot 199 so that during the depth adjustment, the end of the wire 197 is invisible when observed from the right.

Figure 17:
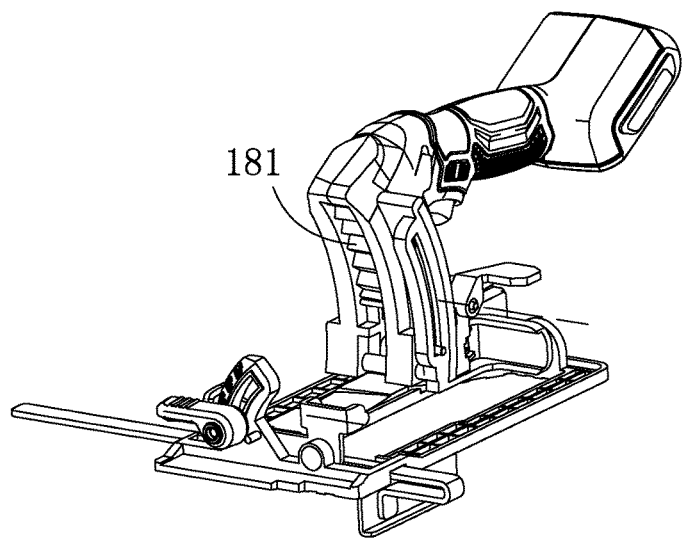
FIG. 17 is a perspective view of a base plate, a bracket, and a handle of a cutting tool with no battery set installed according to another example of the present application.
Figure 18:
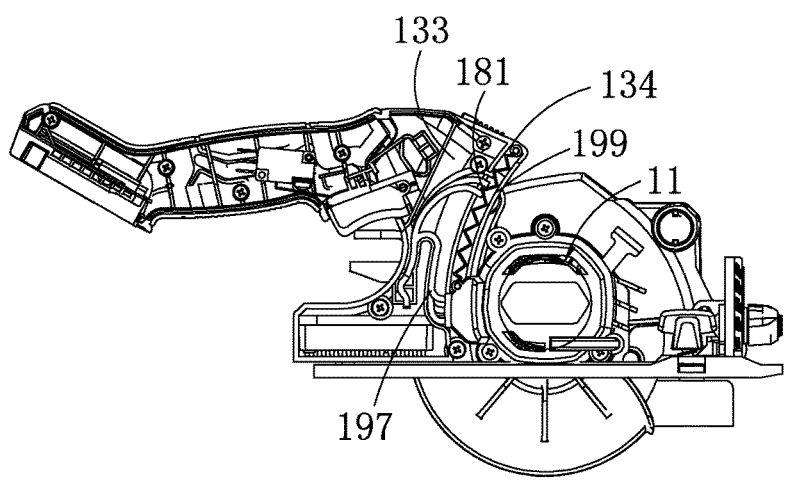
FIG. 18 is a left view of part of a handle, a body, and a base plate of the cutting tool of FIG. 17 with no battery set installed.

As shown in FIGS. 17 to 18, in some examples, the cutting tool 100 includes a telescopic member 181 with a variable effective dimension. The telescopic member 181 is configured to cover at least part of the wire 197 so that the wire 197 is invisible when observed from the front. The effective dimension of the telescopic member 181 is a dimension of at least part of the wire 197 covered by the telescopic member 181. The telescopic member 181 is configured to be a telescopic blind. The handle 13 includes a top connecting point 134. An end of the telescopic member 181 is fixedly connected to the top connecting point 134, and the other end of the telescopic member 181 is fixedly connected to the guide member 198. When the user adjusts the cutting depth of the cutting tool 100, the guide member 198 rotates relative to the base plate 12 about the depth axis 110a, and the position of the handle 13 relative to the base plate 12 is unchanged. When the body 20 rotates downward relative to the base plate 12, the distance between the top connecting point 134 and the guide member 198 increases, the telescopic member 181 is stretched, and the effective dimension of the telescopic member 181 increases. When the body 20 rotates upward relative to the base plate 12, the distance between the top connecting point 134 and the guide member 198 decreases, the telescopic member 181 is compressed, and the effective dimension of the telescopic member 181 decreases. When the cutting tool 100 is observed from the right, the wire 197 is invisible. When the cutting tool 100 is observed from the front, the wire 197 is invisible. The wire 197 is invisible when the cutting tool 100 is observed from the right and the front so that the cutting tool 100 is simple and beautiful in appearance and prevents at least part of dust from entering the cutting tool 100.

Figure 19:
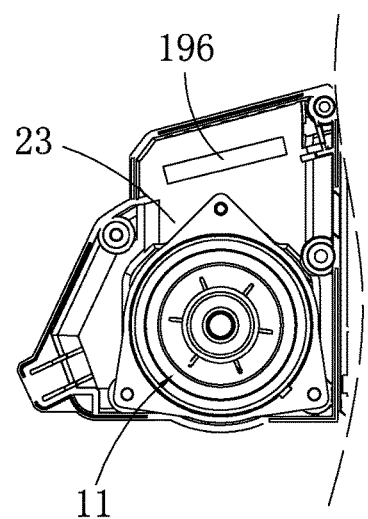
FIG. 19 is a sectional view of a circuit board and a drive device of a cutting tool according to another example of the present application.
Figure 20:
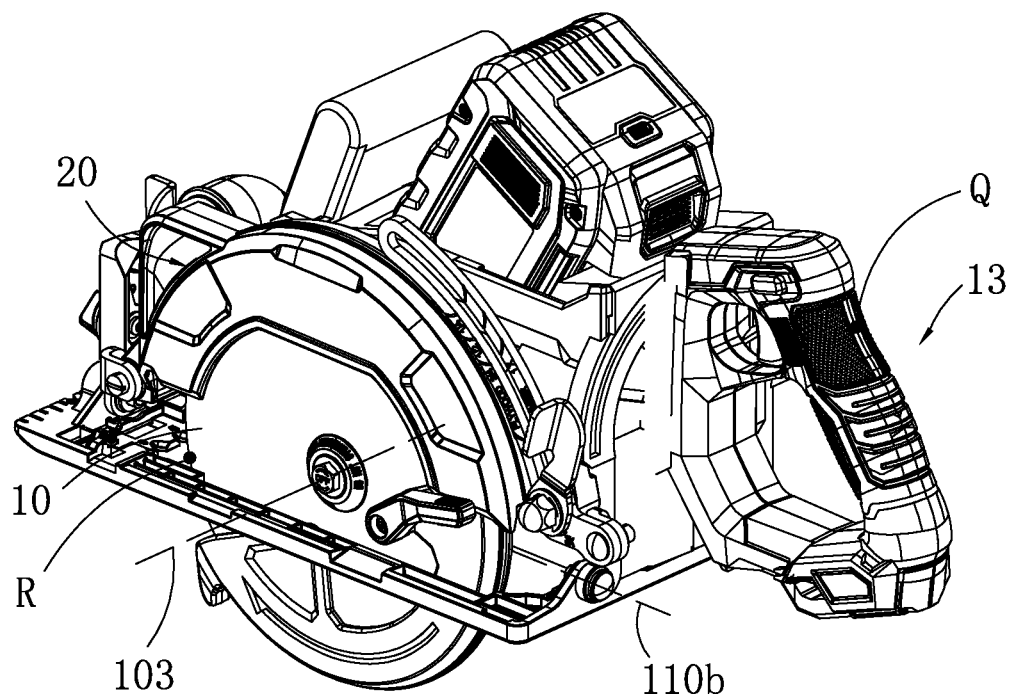
FIG. 20 is a perspective view of a cutting tool with a battery set installed according to another example of the present application.

As shown in FIG. 19, in some examples, the circuit board 196 is configured in the accommodation cavity 23. The accommodation cavity 23 also accommodates the drive device 11, and at least part of the circuit board 196 is configured above the drive device 11. In this manner, the space in the accommodation cavity 23 is fully utilized, achieving a compact structure.

Technical solutions of another example are described below. Parts of this example the same as or corresponding to those of example one use the corresponding reference numerals in example one. A cutting tool 100 in this example has a drive device 11, a base plate 12, and a body 20 with substantially the same structures as those in example one. For simplicity, only differences between this example and example one are described. As shown in FIGS. 20 to 25, this example differs from example one mainly in that a handle 13 is movably connected to the body 20.

In this example, the drive device 11 drives a saw blade 10 to rotate about a third axis 103. The handle 13 is configured to rotate about a fourth axis 104. The cutting tool 100 also includes a locking mechanism 19 having a locked state and a released state. The locked state makes the position of the handle 13 relative to the base plate 12 unchanged, and the released state allows the handle 13 to move relative to the base plate 12. The locking mechanism 19 includes a lock 191, and the lock 191 can move relative to the base plate 12 to a first position and a second position. When the lock 191 is at the first position, the locking mechanism 19 is in the locked state that makes the position of the handle 13 relative to the base plate 12 unchanged. When the lock 191 is at the second position, the locking mechanism 19 is in the released state that allows the handle 13 to move relative to the base plate 12. When the locking mechanism 19 is in the locked state, the handle 13 is locked by the lock 191 to be fixed relative to the base plate 12. When the locking mechanism 19 is in the released state, the handle 13 is released by the lock 191 to move relative to the base plate 12. The locking mechanism 19 may be configured to be a structure with a protrusion and a recess, a structure with a plughole and a post, or a lever structure, which is not limited here. When the locking mechanism 19 is in the released state, the handle 13 is clearance-fitted with the lock 191, and a user can easily rotate the handle 13 relative to the base plate 12. When the locking mechanism 19 is in the locked state, the handle 13 is fixedly connected to the lock 191, and the lock 191 prevents the user from rotating the handle 13 relative to the base plate 12.

The locking mechanism 19 also includes an operating member 192, and the user operates the operating member 192 to switch the locking mechanism 19 between the locked state and the released state. In this example, an end of the lock 191 is configured for at least part of the operating member 192 to pass through, and the end of the lock 191 is substantially 0-shaped. The operating member 192 includes a first rotation portion 192a and a second rotation portion 192b. The first rotation portion 192a is configured to be operated by the user to rotate about a sixth axis 186, and the second rotation portion 192b is configured to be operated by the user to rotate about a seventh axis 187. The first rotation portion 192a has a locked state and an active state. In this example, when the first rotation portion 192a is in the locked state, the first rotation portion 192a is fixed relative to the handle 13, and the first rotation portion 192a prevents the user from rotating the second rotation portion 192b. When the first rotation portion 192a is in the active state, the first rotation portion 192a can move relative to the handle 13, and the first rotation portion 192a allows the user to rotate the second rotation portion 192b. When the user operates the operating member 192, the first rotation portion 192a is rotated about the sixth axis 186 such that the first rotation portion 192a is in the active state, and then the second rotation portion 192b is rotated about the seventh axis 187. The second rotation portion 192b has a locked state and an active state. When the second rotation portion 192b is in the locked state, the second rotation portion 192b prevents the lock 191 from moving, the lock 191 is at the first position, and the locking mechanism 19 is in the locked state. When the second rotation portion 192b is in the active state, the second rotation portion 192b allows the lock 191 to move, the lock 191 is at the second position, and the locking mechanism 19 is in the released state. The second rotation portion 192b may be a cam structure or an Archimedes spiral structure. The first rotation portion 192a and the second rotation portion 192b may be connected by a pin. The handle 13 is movably connected to the body 20 so that the posture of the user holding the handle 13 is adjustable and complies with ergonomics. The cutting tool 100 includes the locking mechanism 19 so that the user can adjust the handle 13 to different positions and lock the handle 13, which is easy and convenient to operate.

The fourth axis 104 is substantially perpendicular to the third axis 103. The handle 13 can move to a first initial position. When the handle 13 moves to the first initial position, the handle 13 extends substantially perpendicularly relative to the base plate 12. When the user holds the handle 13 to use the cutting tool 100, a force application point Q is defined for a palm of the user on the handle 13, and a point where the saw blade 10 is in contact with a cut material is defined as a force receiving point R. It is to be noted that the force application point Q and the force receiving point R are a point where the user is in contact with the handle 13 and the point where the cut material is in contact with the saw blade 10, respectively, and specific positions of the force application point Q and the force receiving point R are not limited. The shorter the distance between the force application point Q and the force receiving point R in the up and down direction, the smaller thrust the user needs to apply, that is, the more effortlessly the user operates the cutting tool 100. The saw blade 10 has a vertical cutting state where the saw blade 10 is substantially perpendicular to the base plate 12 and an inclined cutting state where the saw blade 10 is inclined relative to the base plate 12. When the handle 13 moves to the first initial position, the saw blade 10 is in the vertical cutting state. The handle 13 can also move to a first rotational position. When the saw blade 10 is in the inclined cutting state, the body 20 rotates relative to the base plate 12 about an angle axis 110b so as to obliquely cut the cut material, the handle 13 rotates with the body 20 relative to the base plate 12, and the user may rotate the handle 13 about the fourth axis 104 to the first rotational position to comfortably hold the handle 13. When the cutting tool 100 obliquely cuts the cut material, cutting resistance is relatively large. The fourth axis 104 is substantially perpendicular to the third axis 103, and the handle 13 can rotate relative to the base plate 12 about the fourth axis 104 to the first rotational position. In this manner, the user can adjust the position of the handle 13, the height of the force application point Q is reduced, the distance between the force application point Q and the force receiving point R in the up and down direction is shortened, and the operation is easy and labor-saving. The handle 13 can rotate about the fourth axis 104 and is suitable for a user who often works with a right hand and a user who often works with a left hand, improving the comfort of different users using the cutting tool 100.

Figure 21:
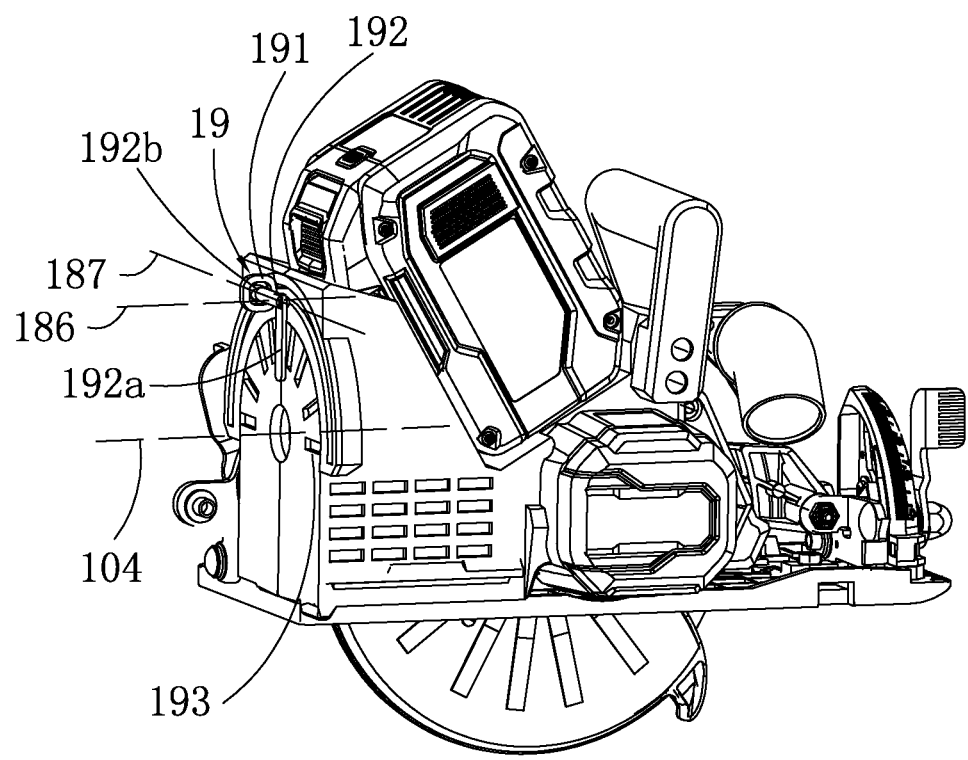
FIG. 21 is a perspective view of a body of the cutting tool of FIG. 20 with the battery set installed.
Figure 22:
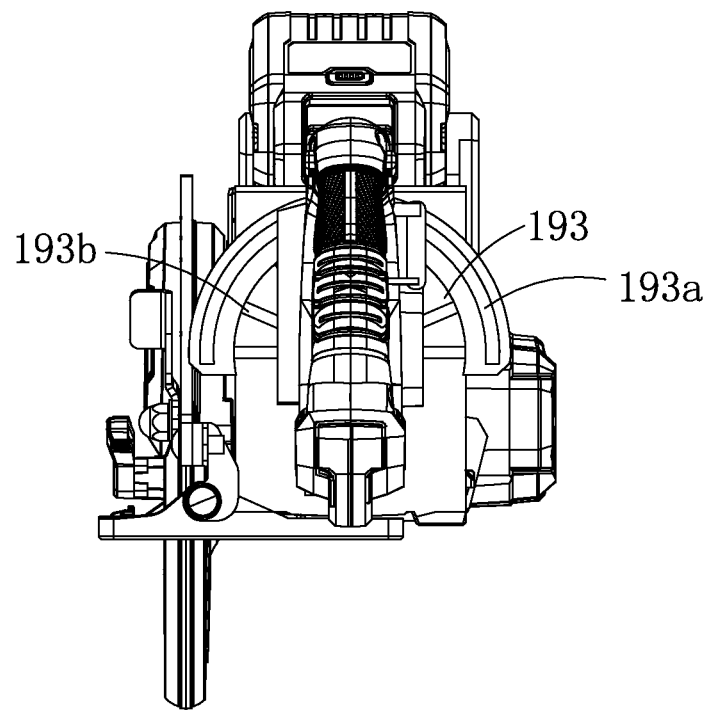
FIG. 22 is a rear view of the cutting tool in FIG. 20.

As shown in FIGS. 21 and 22, the cutting tool 100 also includes a first limiting mechanism 193. The first limiting mechanism 193 is configured to limit an angle by which the handle 13 rotates about the fourth axis 104. The first limiting mechanism 193 restricts the angle by which the handle 13 rotates about the fourth axis 104 to being greater than or equal to 0° and less than or equal to 180°. In this example, the first limiting mechanism 193 includes a first slot 193a and a second groove 193b. The first slot 193a is configured on the body 20 and is substantially arc-shaped. The other end of the lock 191 is substantially T-shaped, and the first slot 193a is configured to accommodate the other end of the lock 191. When the handle 13 rotates relative to the base plate 12, the other end of the lock 191 slides along the first slot 193a. The second groove 193b is configured to mate with the handle by an axle pin or a rib. As shown in FIG. 22, in this example, the handle 13 is formed with a third rib 333 configured to mate with the second groove 193b. The second groove 193b is formed on the body 20, and the second groove 193b extends in a radial direction of the fourth axis 104. Multiple second grooves 193b may be provided, and the multiple second grooves 193b correspond to multiple cutting angles. When the locking mechanism 19 is in the released state, the user may rotate the handle 13 about the fourth axis 104, engage the third rib 333 with the second groove 193b corresponding to a different cutting angle, and adjust the angle of the handle 13 to comfortably use the cutting tool 100.

Figure 23:
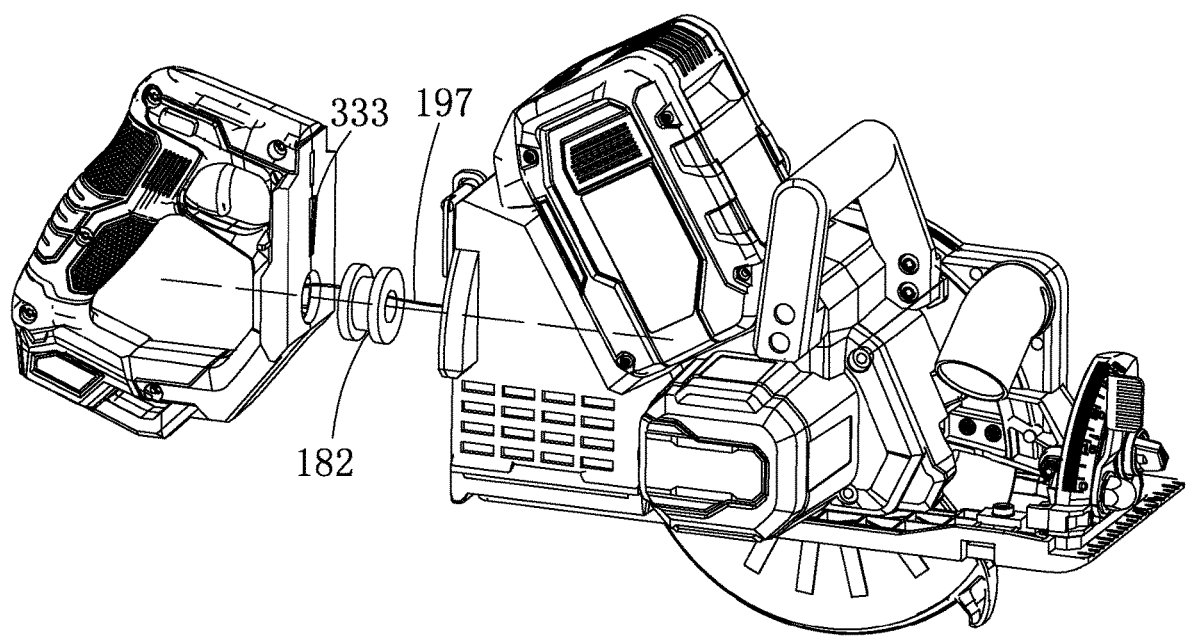
FIG. 23 is an exploded view of a handle, a connecting mechanism, and a body of the cutting tool in FIG. 20.

As shown in FIG. 23, the cutting tool 100 includes a wire 197 configured to be connected to the drive device 11. The cutting tool 100 further includes a connecting mechanism 182 for connecting the handle 13 to the body 20. The connecting mechanism 182 is configured to be hollow and configured for at least part of the wire 197 to pass through. The handle 13 is formed with a first fitting hole 188, the body is formed with a second fitting hole 189, and the first fitting hole 188 and the second fitting hole 189 are configured to be movably connected through the connecting mechanism 182. In the direction of the fourth axis 104, the first fitting hole 188, the connecting mechanism 182, and the second fitting hole 189 are arranged in sequence. The connecting mechanism 182 connects the handle 13 to the body 20, and the connecting mechanism 182 is configured to be hollow and beneficial for protecting the wire 197 from damage.

Figure 24:
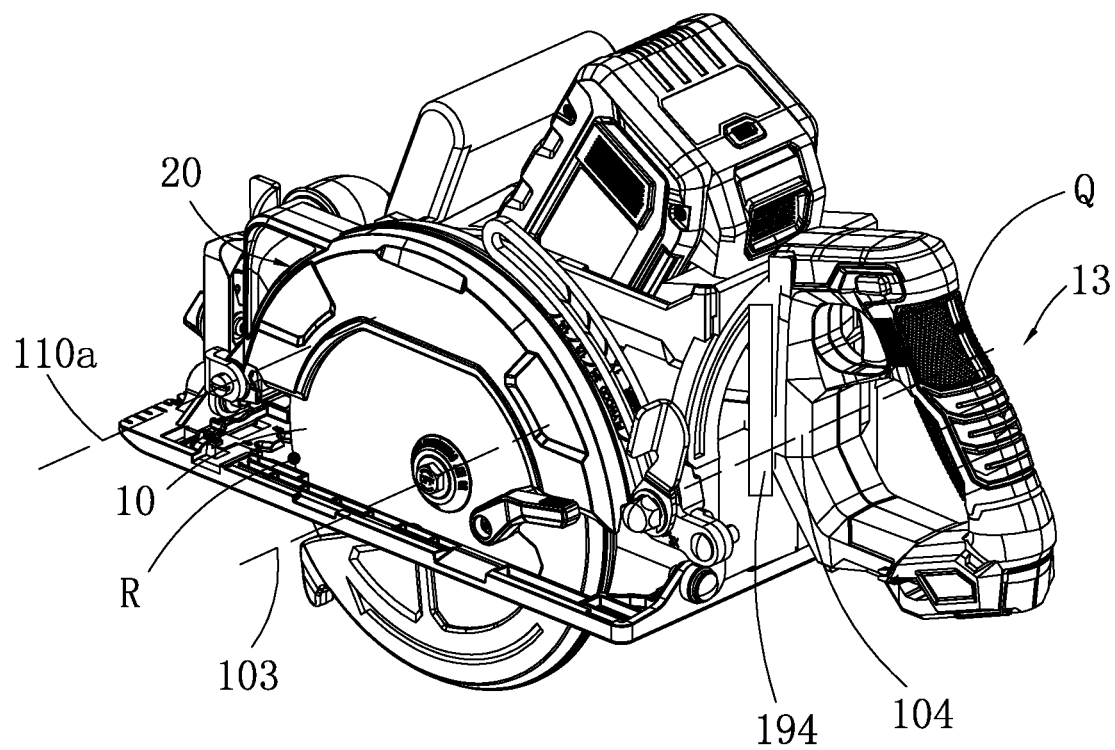
FIG. 24 is a perspective view of another example of a cutting tool of the present application.

As shown in FIG. 24, in other examples, the fourth axis 104 is substantially parallel to the third axis 103. The saw blade 10 has a deep cutting state and a shallow cutting state. When the saw blade 10 is in the deep cutting state, a depth adjustment device 15 prevents a cutting depth of the cutting tool 100 from increasing. The cutting depth of the cutting tool 100 when the saw blade 10 is in the shallow cutting state is smaller than the cutting depth of the cutting tool 100 when the saw blade 10 is in the deep cutting state. The handle 13 can move to a second initial position. When the handle 13 moves to the second initial position, the saw blade 10 is in the deep cutting state. The handle 13 can also move to a second rotational position. When the saw blade 10 is in the shallow cutting state, the body 20 rotates relative to the base plate 12 about a depth axis 110a to reduce the depth at which the cutting tool 100 cuts the cut material, the handle 13 rotates with the body 20 substantially upward relative to the base plate 12, the distance between the force application point Q and the force receiving point R in the up and down direction is relatively large, and the cutting resistance of the cutting tool 100 is relatively large. The user may rotate the handle 13 substantially downward about the fourth axis 104 to the second rotational position to comfortably hold the handle 13. The fourth axis 104 is substantially parallel to the third axis 103, and the handle 13 can rotate relative to the base plate 12 about the fourth axis 104 to the second rotational position. In this manner, the user can adjust the position of the handle 13, the height of the force application point Q is reduced, the distance between the force application point Q and the force receiving point R in the up and down direction is shortened, and the operation is easy and labor-saving. The cutting tool 100 further includes a second limiting mechanism 194. The second limiting mechanism 194 is configured to limit an angle by which the handle 13 rotates about the fourth axis 104. The second limiting mechanism 194 restricts the angle by which the handle 13 rotates about the fourth axis 104 to being greater than or equal to 0° and less than or equal to 35°.

Figure 25:
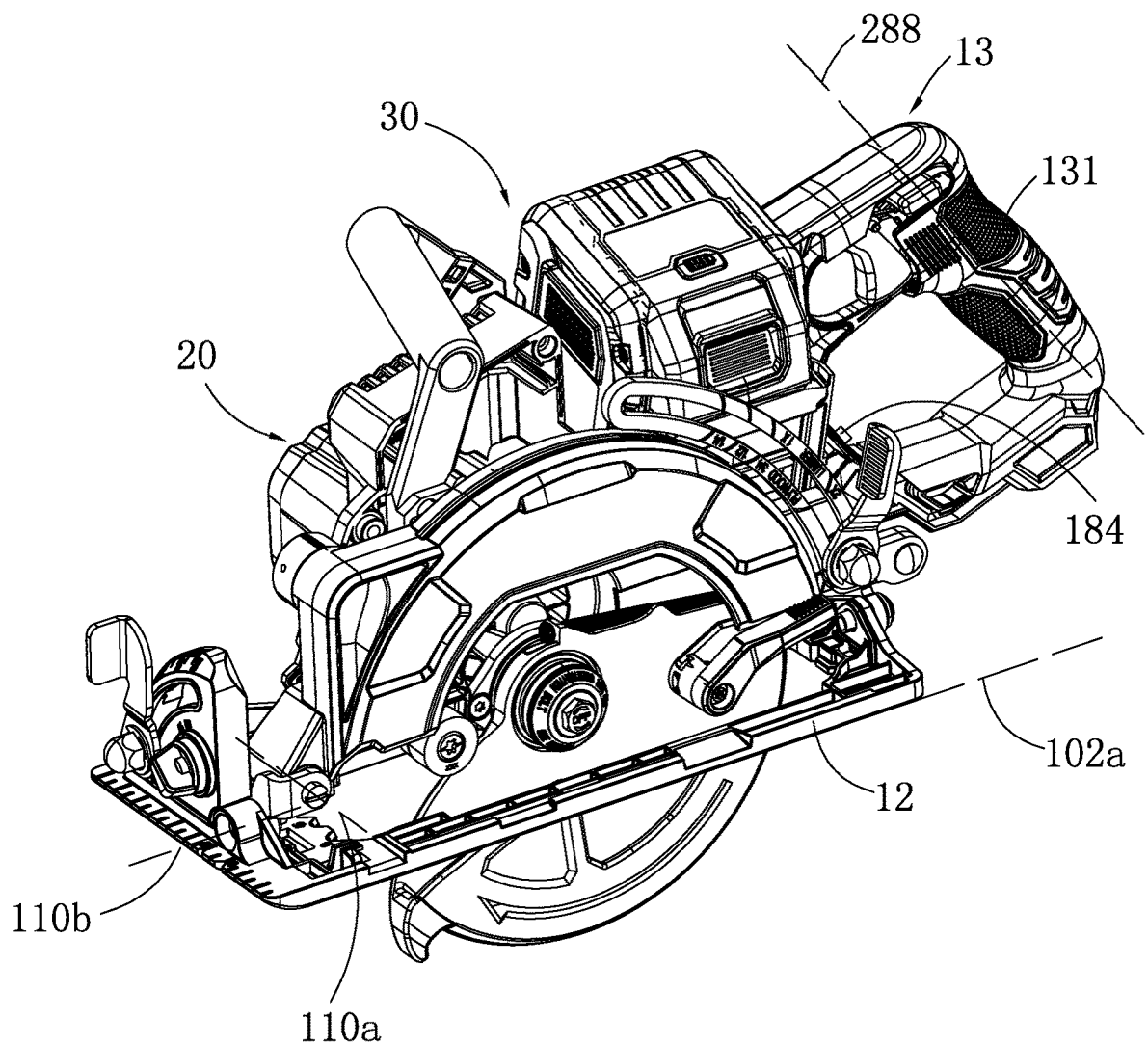
FIG. 25 is a perspective view of another example of a cutting tool of the present application with a battery set installed.
Figure 26:
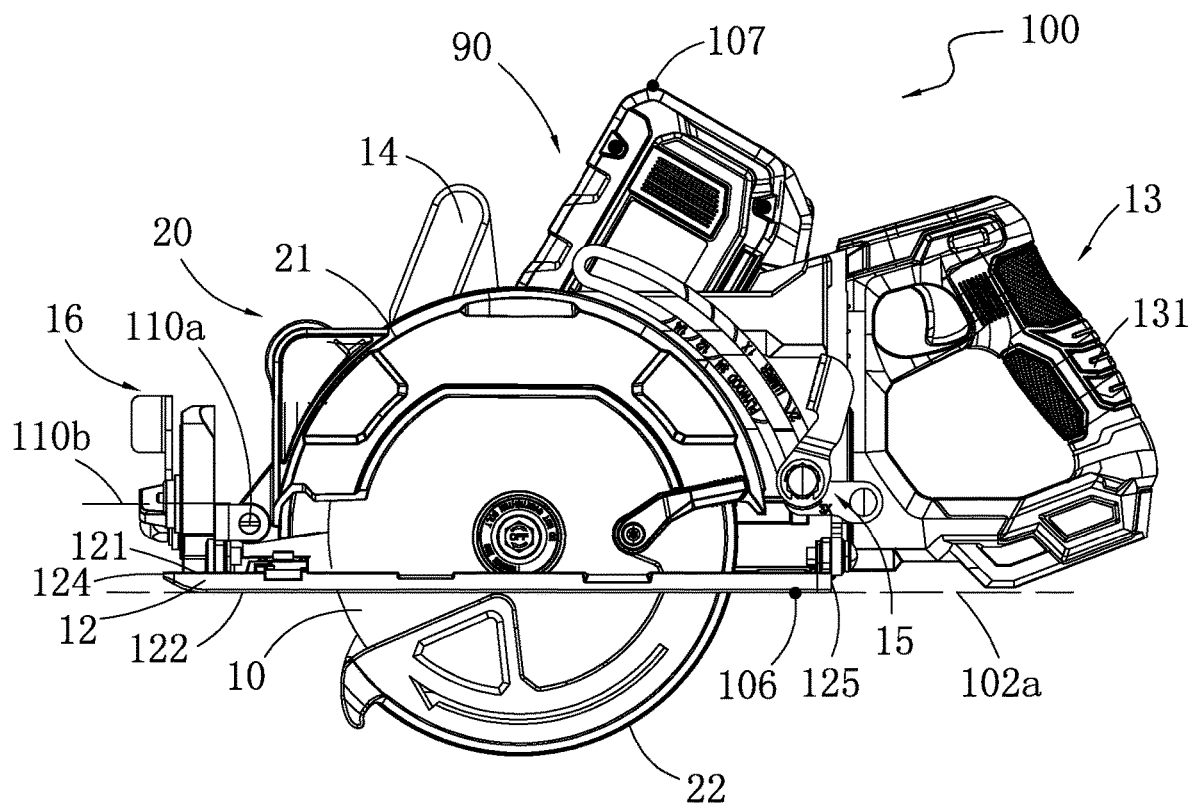
FIG. 26 is a left view of a cutting tool with a battery set installed according to an example of the present application.
Figure 27:
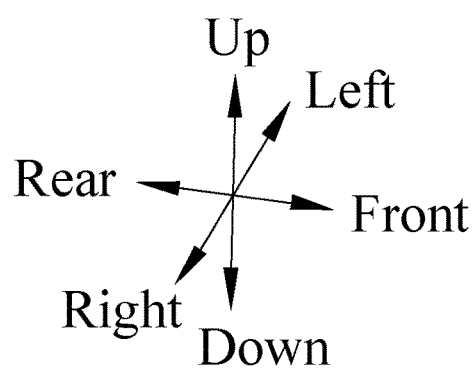
FIG. 27 is a perspective view of the cutting tool in FIG. 26.
Figure 27:
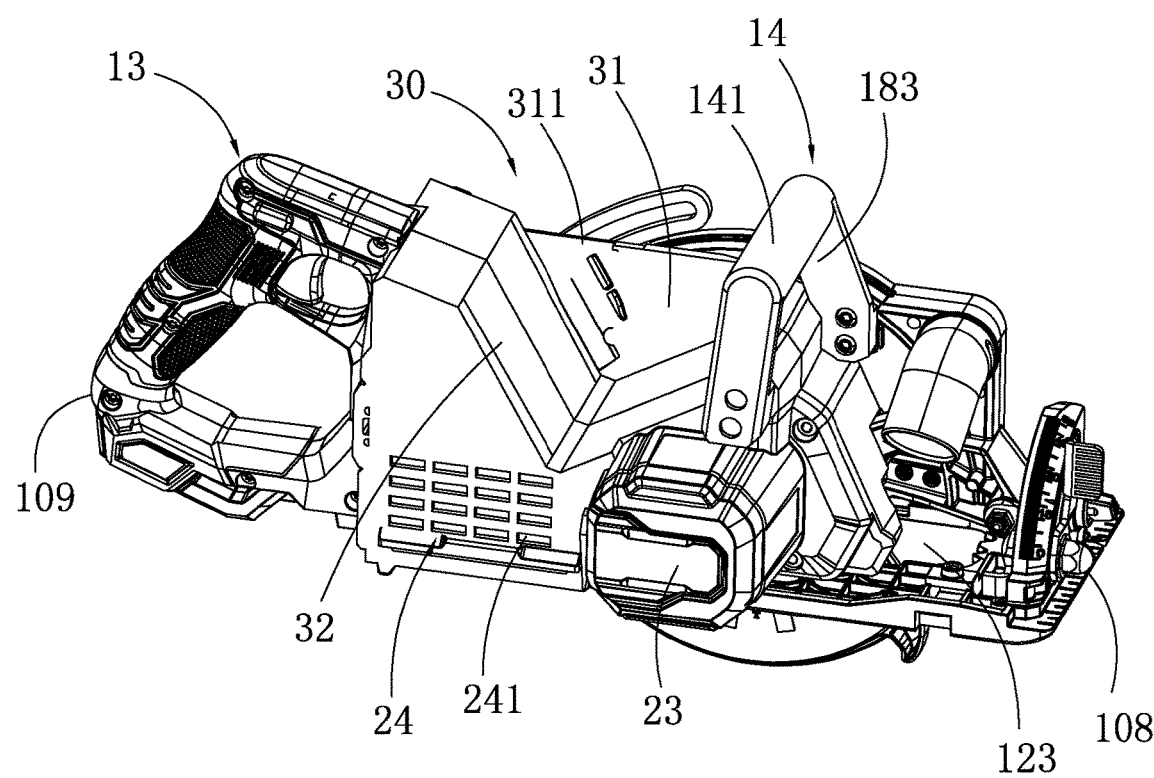
Figure 28:
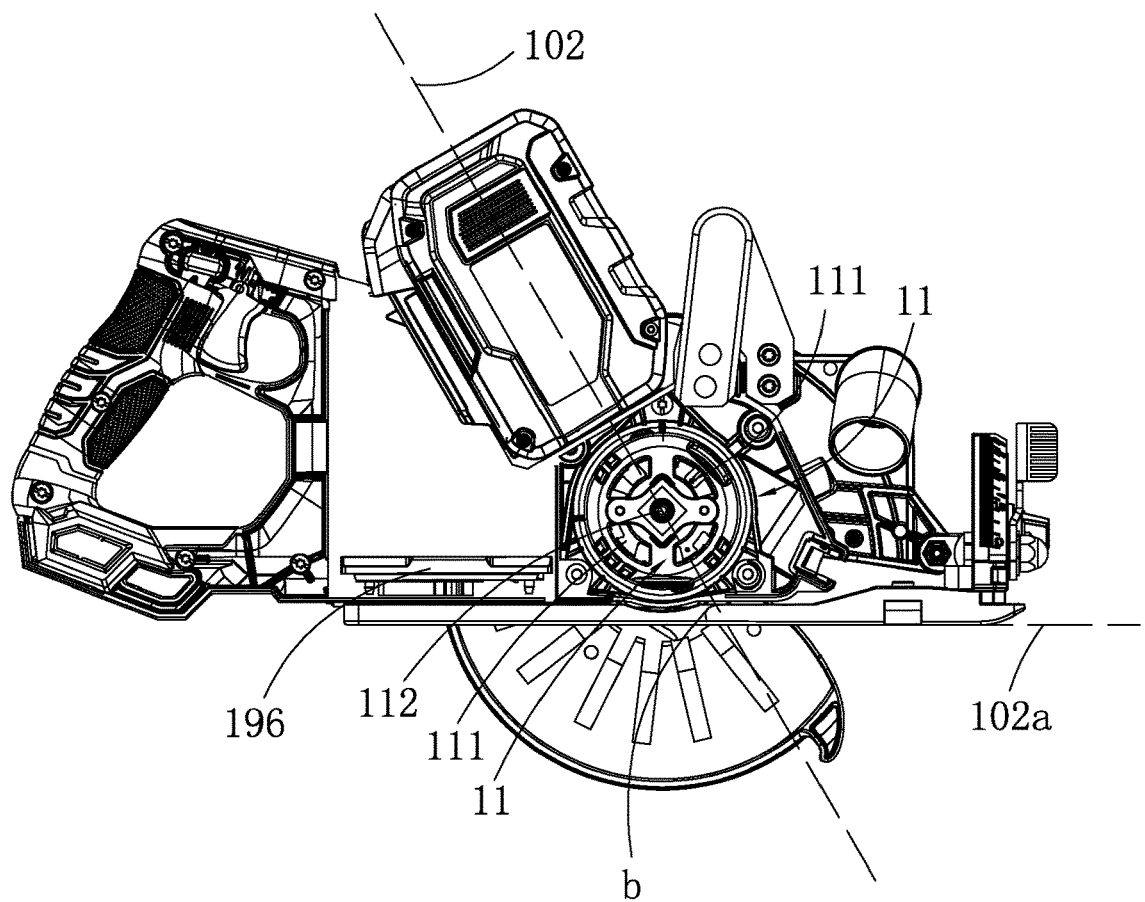
FIG. 28 is a right view of part of the structure of the cutting tool of FIG. 26 with the battery set installed.
Figure 29:
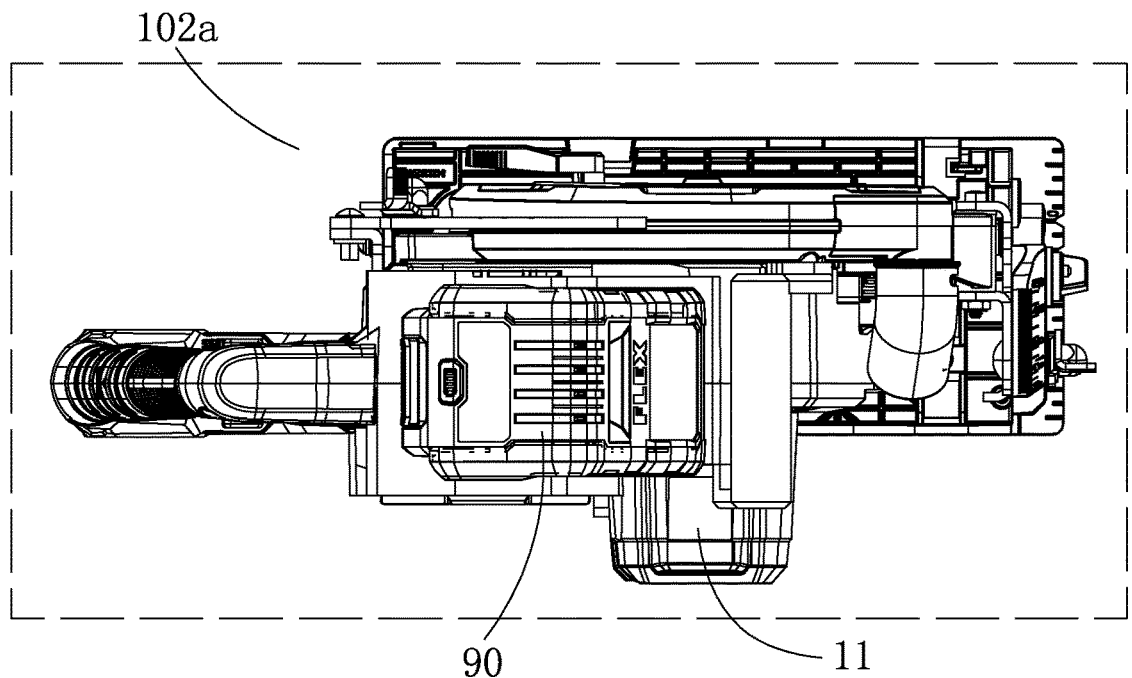
FIG. 29 is a top view of the cutting tool of FIG. 26 with the battery set installed.
Figure 30:
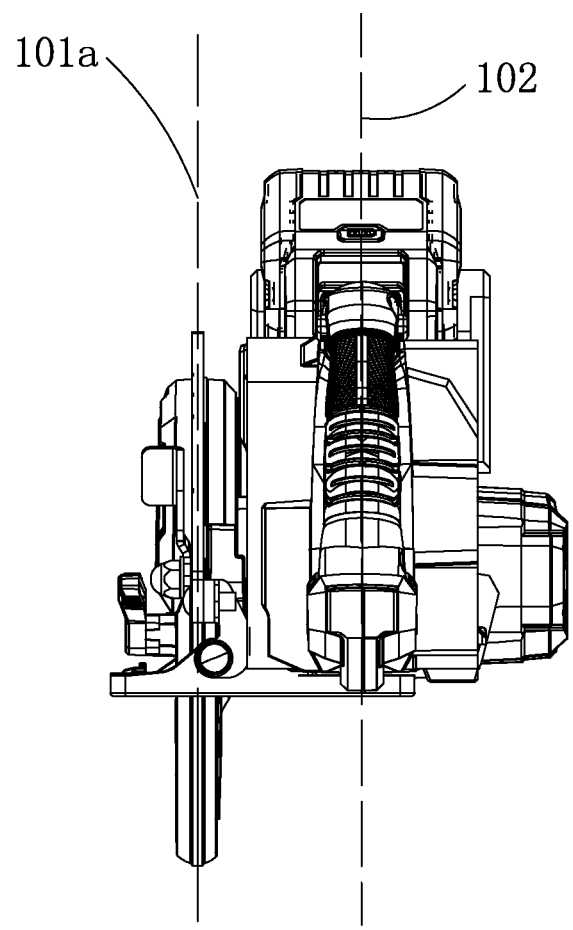
FIG. 30 is a rear view of the cutting tool of FIG. 26 with the battery set installed.
Figure 31:
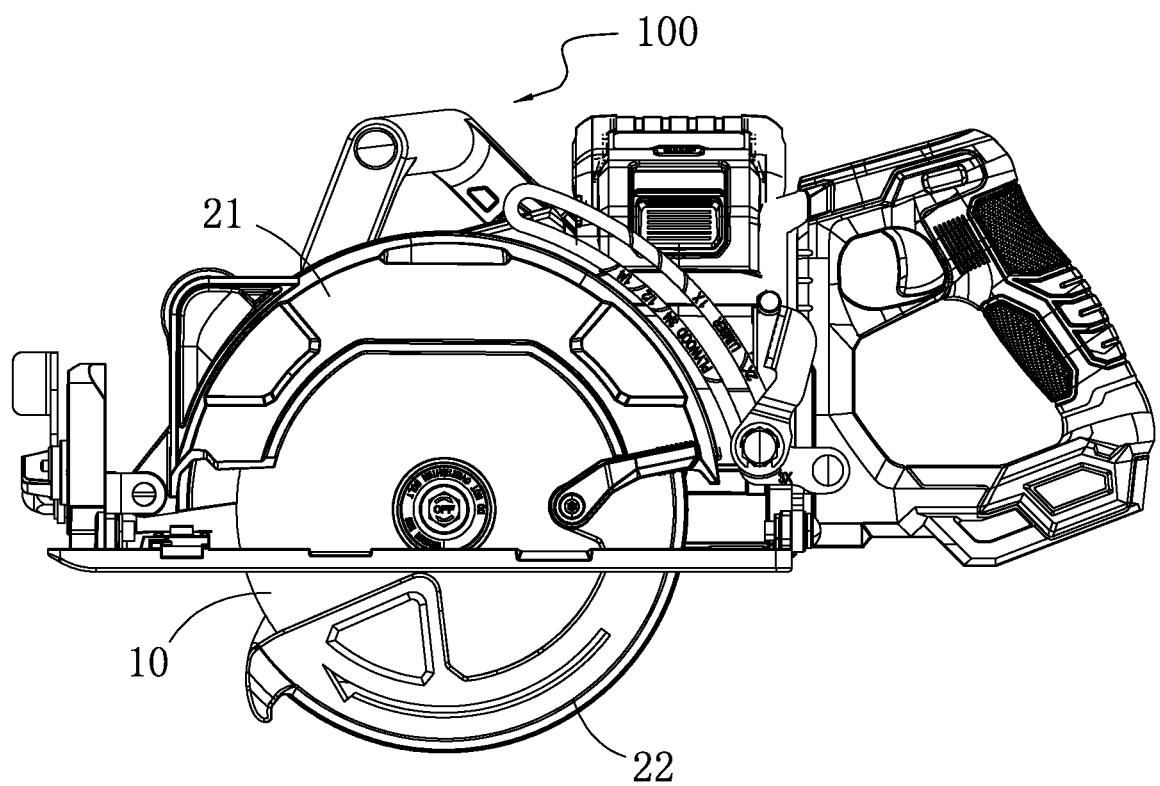
FIG. 31 is a left view of a cutting tool according to another example of the present application.
Figure 32:
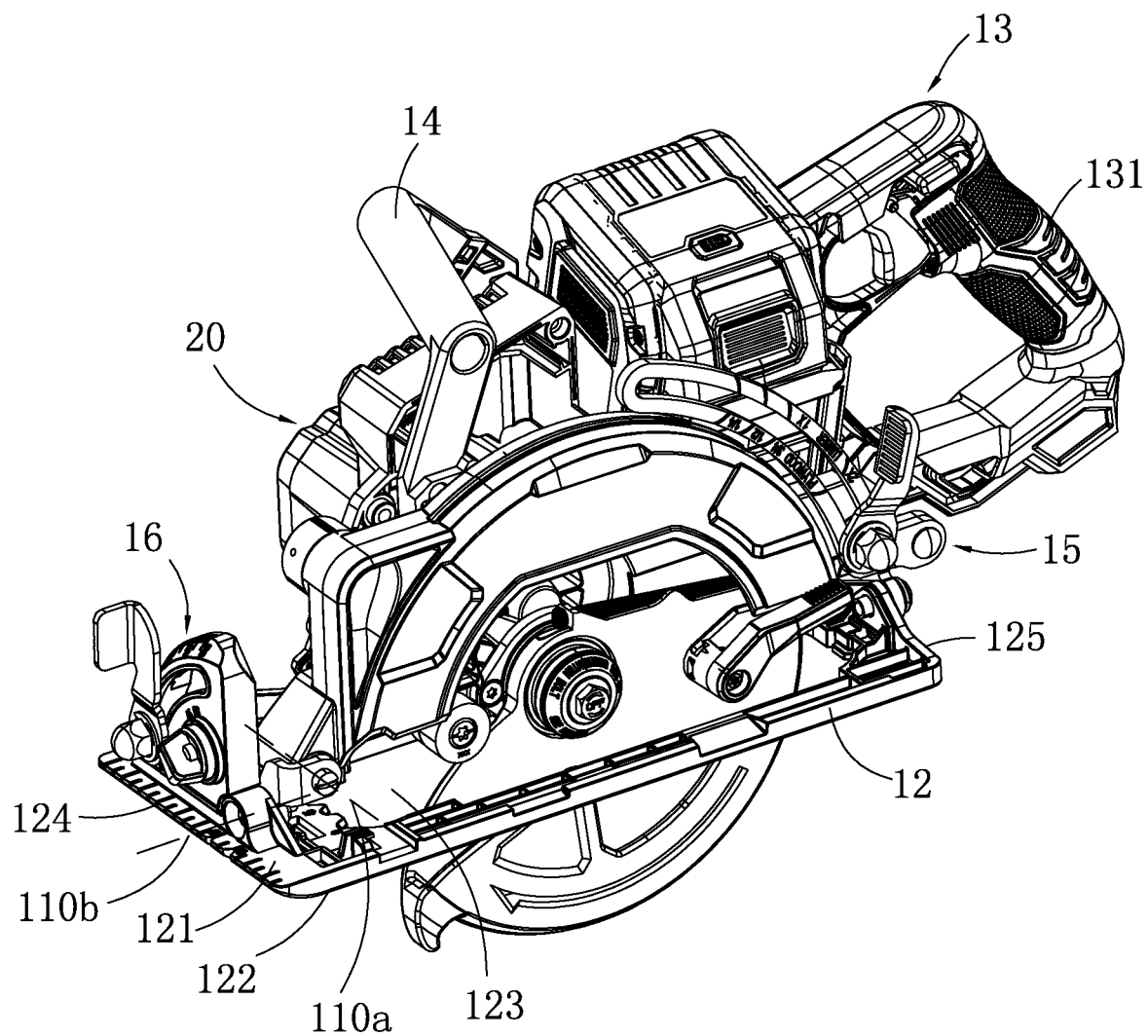
FIG. 32 is a perspective view of the cutting tool in FIG. 31.
Figure 33:
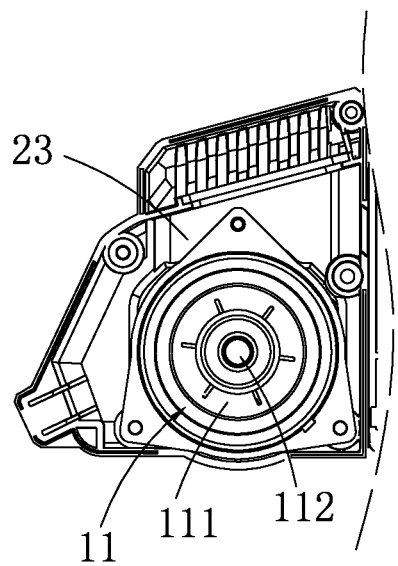
FIG. 33 is a schematic view of part of the structure of a body and a drive device of the cutting tool in FIG. 31.

Technical solutions of another example are described below. Parts of this example the same as or corresponding to those of example one use the corresponding reference numerals in example one. A cutting tool 100 in this example has a drive device 11, a base plate 12, and a body 20 with substantially the same structures as those in example one. For simplicity, only differences between this example and example one are described. As shown in FIG. 25, this example differs from example one mainly in that a handle 13 is fixedly connected to the base plate 12.

In this example, the body 20 is movably connected to the base plate 12. The body 20 is configured to rotate relative to the base plate 12 about a depth axis 110a and an angle axis 110b. The handle 13 is configured to be connected to the base plate 12 through a fixing member 184 which may be a screw. When the body 20 rotates relative to the base plate 12 about the depth axis 110a or the angle axis 110b, the body 20 rotates relative to the handle 13 about the depth axis 110a or the angle axis 110b. The position of the handle 13 relative to the base plate 12 is fixed so that during depth adjustment and angle adjustment, the position of the handle 13 is unchanged, which is convenient for the user to hold the handle 13 easily and effortlessly. In this example, a junction portion 30 is fixedly connected to the handle 13. In some examples, the junction portion 30 and the handle 13 are integrally formed. In other examples, the junction portion 30 may be fixedly connected to the body 20. In some examples, the junction portion 30 and the body 20 are integrally formed. In other examples, the handle 13 includes a first grip 131, and a lower surface 122 is defined as a second plane 102a. The first grip 131 is fixed relative to the base plate 12. The first grip 131 extends substantially along an eighth straight line 288, where the angle between the eighth straight line 288 and the second plane 102a is greater than or equal to 0° and less than or equal to 45°. In this manner, no matter whether the user performs the angle adjustment or the depth adjustment in the process of using the cutting tool 100, the user can always hold the handle comfortably in accordance with ergonomics.

Technical solutions of another example are described below. Parts of this example the same as or corresponding to those of example one use the corresponding reference numerals in example one. A cutting tool 100 in this example has a drive device 11, a base plate 12, and a body 20 with substantially the same structures as those in example one. For simplicity, only differences between this example and example one are described. As shown in FIGS. 26 to 30, this example differs from example one mainly in that a projection of a battery set 90 on a second plane 102a at least partially overlaps a projection of the drive device 11 on the second plane 102a.

At least part of the battery set 90 is disposed above the drive device 11. A battery compartment 31 includes an opening portion 311 opening in a direction away from the base plate 12, and the opening portion 311 allows the battery set 90 to enter the battery compartment 31. A lower surface 122 is defined as the second plane 102a, and the second plane 102a is substantially parallel to the front and rear direction. The projection of the battery set 90 on the second plane 102a at least partially overlaps the projection of the drive device 11 on the second plane 102a. At least part of the battery set 90 is above an electric motor 111, and the battery set 90 coincides with the electric motor 111 in position in the front and rear direction so that the overall length of the cutting tool 100 can be shortened, the structure is compact, the volume of the cutting tool 100 is reduced visually, and the cutting tool 100 is simple and beautiful. The projection of the battery set 90 on the second plane 102a overlaps a projection of the electric motor 111 on the second plane 102a in the front and rear direction so that the center of gravity of the cutting tool 100 is close to the center of rotation of a saw blade 10, and the balance of the cutting tool 100 in weight in the front and rear direction and the cutting efficiency of the cutting tool 100 are not damaged. The projection of the battery set 90 on the second plane 102a overlaps the projection of the electric motor 111 on the second plane 102a in the left and right direction so that the center of gravity of the cutting tool 100 is close to the center of the width of a handle 13 in the left and right direction, the balance of the cutting tool 100 in the left and right direction is not damaged, and the user is provided with a good grip. In this example, the saw blade 10 is defined as a first plane 101a, and the battery set 90 is configured to be mounted to a junction portion 30 along a second straight line 102. The second straight line 102 is substantially parallel to the first plane 101a and forms an angle b with the second plane 102a. In this example, the angle b is greater than or equal to 300 and less than or equal to 75°. In other examples, the angle b is greater than or equal to 450 and less than or equal to 60°. It is to be noted that the second straight line 102 is substantially parallel to the first plane 101a, which does not exclude that the second straight line 102 is absolutely parallel to the first plane 101a due to a normal commercial manufacturing tolerance. The battery set 90 is mounted to the junction portion 30 along the second straight line 102, where a specific position of the second straight line 102 is not limited, and the battery set 90 is not restricted to being mounted to the junction portion 30 from front to rear or from rear to front along the second straight line 102. In this example, the battery set 90 is mounted to the junction portion 30 from rear to front along the second straight line 102. The junction portion 30 includes a mounting surface 32 erected relative to the base plate 12, and the mounting surface 32 extends in a manner of being substantially perpendicular to the first plane 101a in the left and right direction. The mounting surface 32 is configured on a side of the junction portion 30 facing the handle 13. The direction in which the battery set 90 is mounted to the junction portion 30 forms an angle with the plane defined by the lower surface 122 so that the battery compartment 31 has a relatively shallow depth in the up and down direction, the length of the battery set 90 extending into the battery compartment 31 is relatively long, and the volume of the junction portion 30 in the front and rear direction occupies a relatively large volume of the cutting tool 100 in the front and rear direction, thereby facilitating the downward configuration of the center of gravity of the cutting tool 100 and reducing the overall height of the cutting tool 100. The battery set 90 is obliquely mounted to the junction portion 30, and the weight of the battery set 90 is dispersed to the mounting surface 32 and positions other than the mounting surface 32, such as a surface of the battery compartment 31 facing the base plate 12, thereby facilitating the installation of battery sets 90 of different sizes, increasing the mounting stability of the battery set 90, and reducing the necessity of enhancing the strength of the junction portion 30.

The cutting tool 100 has a forwardmost end 108 and a rearmost end 109. In this example, the distance from the forwardmost end 108 to the rearmost end 109 is greater than or equal to 400 mm and less than or equal to 480 mm. In other examples, the distance from the forwardmost end 108 to the rearmost end 109 is greater than or equal to 430 mm and less than or equal to 460 mm. The distance from the forwardmost end 108 to the rearmost end 109 is the overall length of the cutting tool 100 in the front and rear direction. The cutting tool 100 also has a highest point 107 and a lowest point 106, where the distance from the highest point 107 to the lowest point 106 is greater than or equal to 190 mm and less than or equal to 240 mm. The lowest point 106 is located on the lower surface 102a. The distance from the highest point 107 to the lowest point 106 is the overall height of the cutting tool 100 in the up and down direction when the cutting tool 100 has the battery set 90 mounted and no saw blade 10 mounted and a second shield 22 rotates relative to the base plate 12 to above the base plate 12. The battery set 90 has a voltage of greater than or equal to 18 V and less than or equal to 60 V. When the cutting tool 100 is adapted to a battery set 90 with a relatively small voltage, the battery set 90 has relatively small dimensions. When the cutting tool 100 is adapted to a battery set 90 with a relatively large voltage, the battery set 90 has relatively large dimensions. The weight of the cutting tool 100 is greater than or equal to 3.6 kg and less than or equal to 5.2 kg. In this example, the weight of the cutting tool 100 is greater than or equal to 3.8 kg and less than or equal to 4.8 kg. The weight of the cutting tool 100 is the weight of the cutting tool 100 with no battery set 90 and no saw blade 10 mounted.

The cutting tool 100 includes a secondary handle 14 including a second grip 141 configured for the user to hold. In this example, at least part of the second grip 141 is disposed in front of the handle 13, and the junction portion 30 is configured between the handle 13 and the secondary handle 14. When using the cutting tool 100, the user holds the handle 13 with one hand and holds the second grip 141 with the other hand to stably use the cutting tool 100. The second grip 141 is enclosed by a grip space 183 for receiving a palm of the user. The second grip 141 is substantially cylindrical. When the user holds the second grip 141, the palm is placed in the grip space 183 to enclose the second grip 141. It is to be noted that the second grip 141 is enclosed by the grip space 183, and a specific shape of the grip space 183 is not limited as long as the grip space 183 can receive the palm of the user. A dimension of the grip space 183 in a thickness direction of the palm of the user is greater than or equal to 20 mm and less than or equal to 120 mm. The thickness direction of the palm of the user is substantially perpendicular to the extension direction of the second grip 141. In this manner, the user can hold the secondary handle 14 easily and comfortably.

The cutting tool 100 further includes a circuit board 196. The battery set 90 is configured above the electric motor 111 so that the circuit board 196 can be configured between the electric motor 111 and the handle 13 in the front and rear direction, and the space between the electric motor 111 and the handle 13 can be fully utilized. The body 20 includes an air inlet portion 24 formed with an air vent 241. Multiple air vents 241 are provided. In this example, the circuit board 196 is disposed on the left side of the air vent 241, thereby facilitating the natural heat dissipation of the circuit board 196 through the air vent 241.

Technical solutions of another example are described below. Parts of this example the same as or corresponding to those of example one use the corresponding reference numerals in example one. As shown in FIGS. 31 to 36, a cutting tool 100 in this example has a drive device 11, a base plate 12, a body 20, and a handle 13 with substantially the same structures as those in example one. For simplicity, only differences between example two and example one are described. The differences between this example and example one mainly lie in the installation position and direction of a battery set 90.

As shown in FIGS. 31 to 35, a battery compartment 31 includes an opening portion 311 opening in a direction away from the base plate 12, and the opening portion 311 allows the battery set 90 to enter the battery compartment 31. The battery set 90 is configured to be mounted to a junction portion 30 along a first straight line 101. A saw blade 10 is defined as a first plane 101a. The saw blade 10 has a vertical cutting state where the saw blade 10 is substantially perpendicular to the base plate 12. In the vertical cutting state, the first plane 101a forms an angle a with the first straight line 101, where the angle a is greater than or equal to 0° and less than or equal to 85°. In this example, the angle a is greater than or equal to 150 and less than or equal to 75°. In other examples, the angle a is greater than or equal to 300 and less than or equal to 60°. It is to be noted that the battery set 90 is mounted to the junction portion 30 along the first straight line 101, where a specific position of the first straight line 101 is not limited, and the battery set 90 is not restricted to being mounted to the junction portion 30 from the top right to the bottom left or from the top left to the bottom right along the first straight line 101. The junction portion 30 includes a mounting surface 32 erected relative to the base plate 12, and the mounting surface 32 extends in a manner of obliquely intersecting the first plane 101a. The mounting surface 32 is configured on a side of the junction portion 30 facing the saw blade 10. The direction in which the battery set 90 is mounted to the junction portion 30 forms an angle with the plane defined by the saw blade 10 so that the battery compartment 31 has a relatively shallow depth in the up and down direction, and the volume of the junction portion 30 in the left and right direction occupies a relatively large volume of the cutting tool 100 in the left and right direction, thereby facilitating the downward configuration of the center of gravity of the cutting tool 100 and ensuring the good overall stability of the cutting tool 100 operated by a user. In this example, the junction portion 30 is disposed between the handle 13 and a secondary handle 14 in the front and rear direction, and the battery set 90 is mounted to the junction portion 30 from the top left to the bottom right along the first straight line 101. The opening portion 311 includes an opening surface 311a, and the opening surface 311a opens towards the top right and extends to a side of the junction portion 30 facing away from the saw blade 10. When the user mounts the battery set 90 to the junction portion 30 along the first straight line 101, an end of the battery set 90 enters the battery compartment 31 through the opening portion 311 from the top left to the bottom right. In this manner, the user can conveniently and easily mount the battery set 90 to the junction portion 30 in an oblique manner in accordance with ergonomics. The opening portion 311 includes the opening surface 311a, and the battery set 90 can be mounted in a state of protruding from the opening surface 311a in the up and down direction. A dimension of the battery compartment 31 in the left and right direction is configured to be larger than dimensions of battery sets 90 of different capacities in the left and right direction, and the battery sets 90 of different capacities are configured with substantially consistent dimensions in the front and rear direction. The structure of the mounting surface 32 is universal among the battery sets 90 of different capacities. In this manner, the user can choose to mount the battery sets 90 of different capacities to the junction portion 30 to apply the cutting tool 100 to different working conditions.

Figure 34:
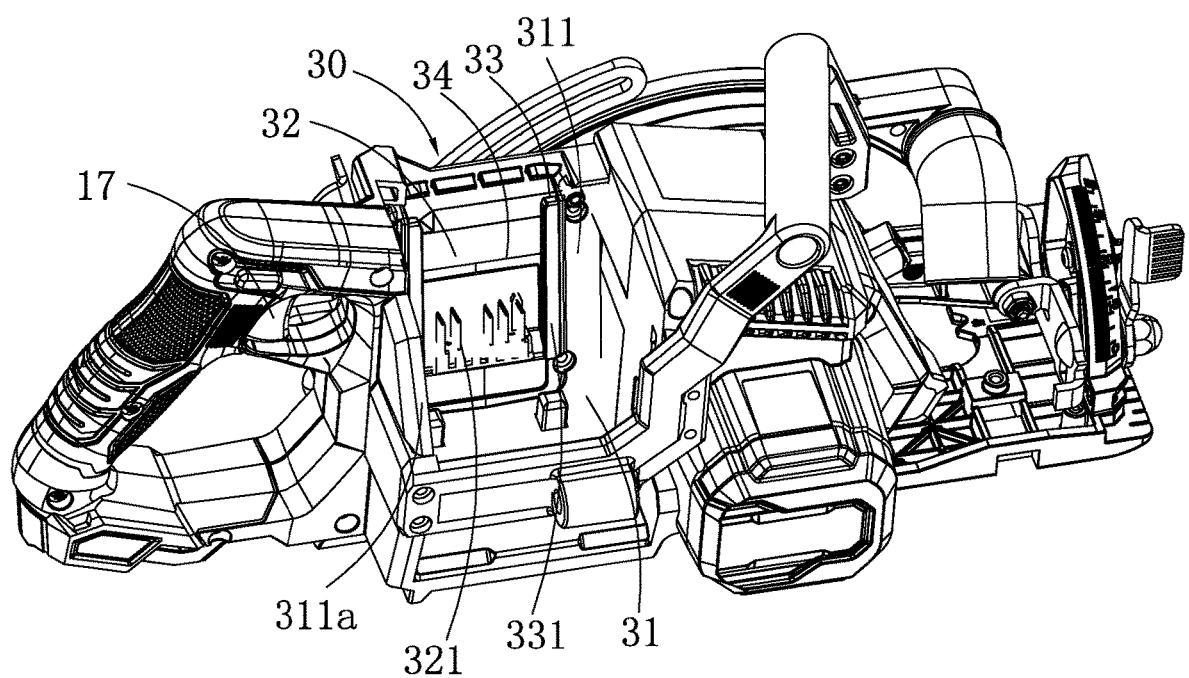
FIG. 34 is a perspective view of the cutting tool of FIG. 31 with no battery set installed.
Figure 35:
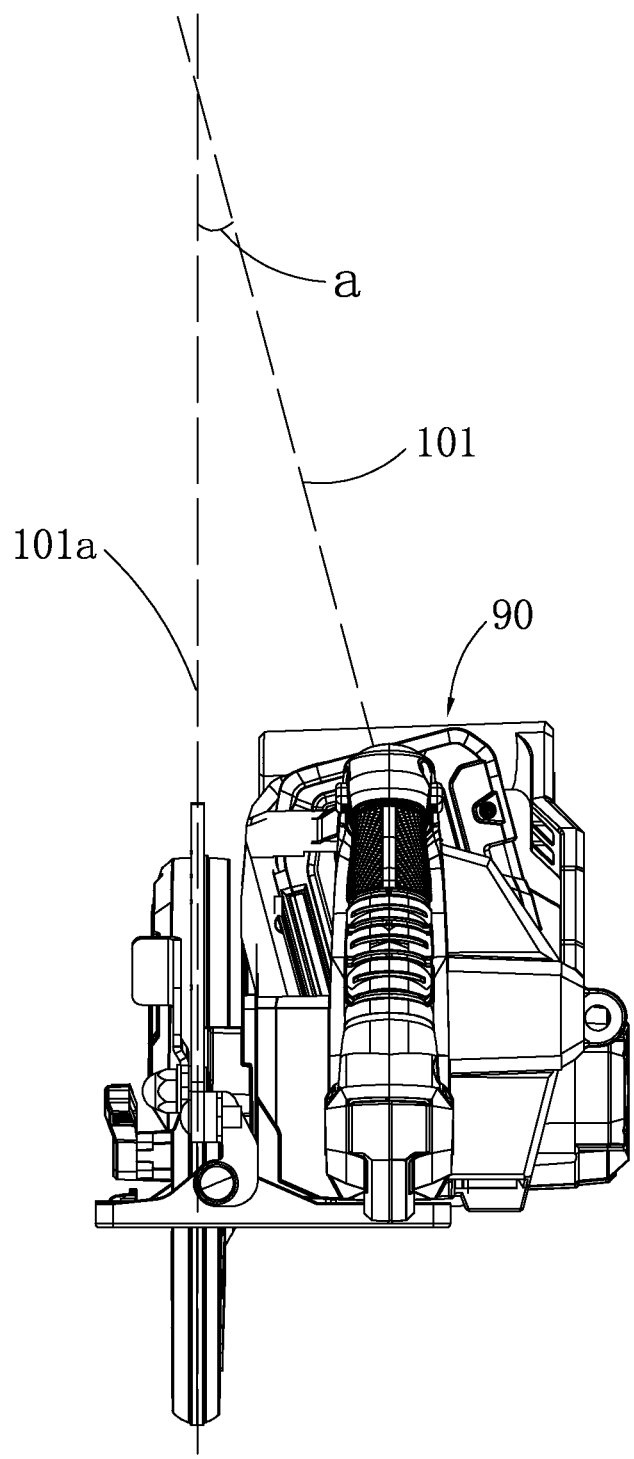
FIG. 35 is a rear view of the cutting tool in FIG. 31.
Figure 36:
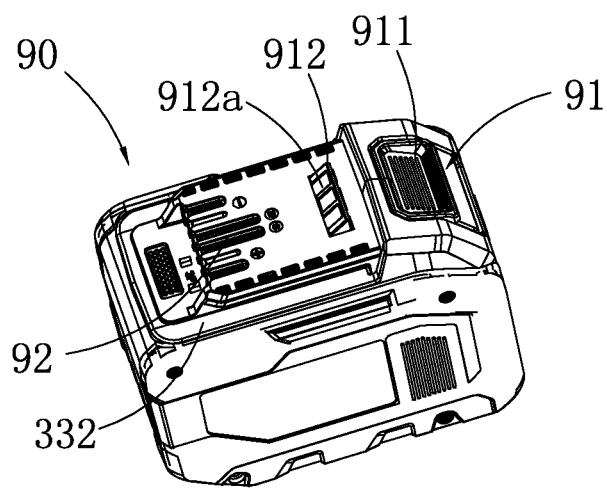
FIG. 36 is a perspective view of a battery set for the cutting tool in FIG. 31.

As shown in FIGS. 34 and 36, the junction portion 30 further includes a guide mechanism 33 extending on the mounting surface 32, and the guide mechanism 33 is configured to engage with the battery set 90. The guide mechanism 33 guides the battery set 90 towards and away from the junction portion 30. In this example, the guide mechanism 33 includes first ribs 331 protruding on the junction portion 30. The battery set 90 is formed with second ribs 332 for interfacing with the first ribs 331. The battery set 90 also includes a snap 91. The snap 91 includes a pressing portion 911 and a clamping portion 912, where the pressing portion 911 and the clamping portion 912 are drivingly connected or integrally formed. The junction portion 30 also includes a locking groove 34. The clamping portion 912 is formed with an oblique surface 912a facing the locking groove 34. When the user moves the battery set 90 into the battery compartment 31 along the guide mechanism 33, and the first ribs 331 and the second ribs 332 are substantially completely interfaced, the clamping portion 912 and the locking groove 34 are locked through the oblique surface 912a, and the battery set 90 is mounted by the user to the junction portion 30 along the first straight line 101. When the user presses the pressing portion 911, the clamping portion 912 is displaced as the pressing portion 911 is pressed, the clamping portion 912 is disengaged from the locking groove 34, and the battery set 90 is detached by the user from the junction portion 30 along the first straight line 101. The battery set 90 includes output terminals 92, and the mounting surface 32 includes input terminals 321. When the output terminals 92 are engaged with the input terminals 321, the battery set 90 is electrically connected to the cutting tool 100. The cutting tool 100 also includes a switch 17 for controlling the cutting tool 100 to start and stop. The switch 17 has an activated state and a closed state. When the battery set 90 is mounted to the junction portion 30 and the switch 17 is in the activated state, the battery set 90 supplies power to an electric motor 111, and the switch 17 controls the electric motor 111 to drive the saw blade 10 to rotate.

Figure 37:
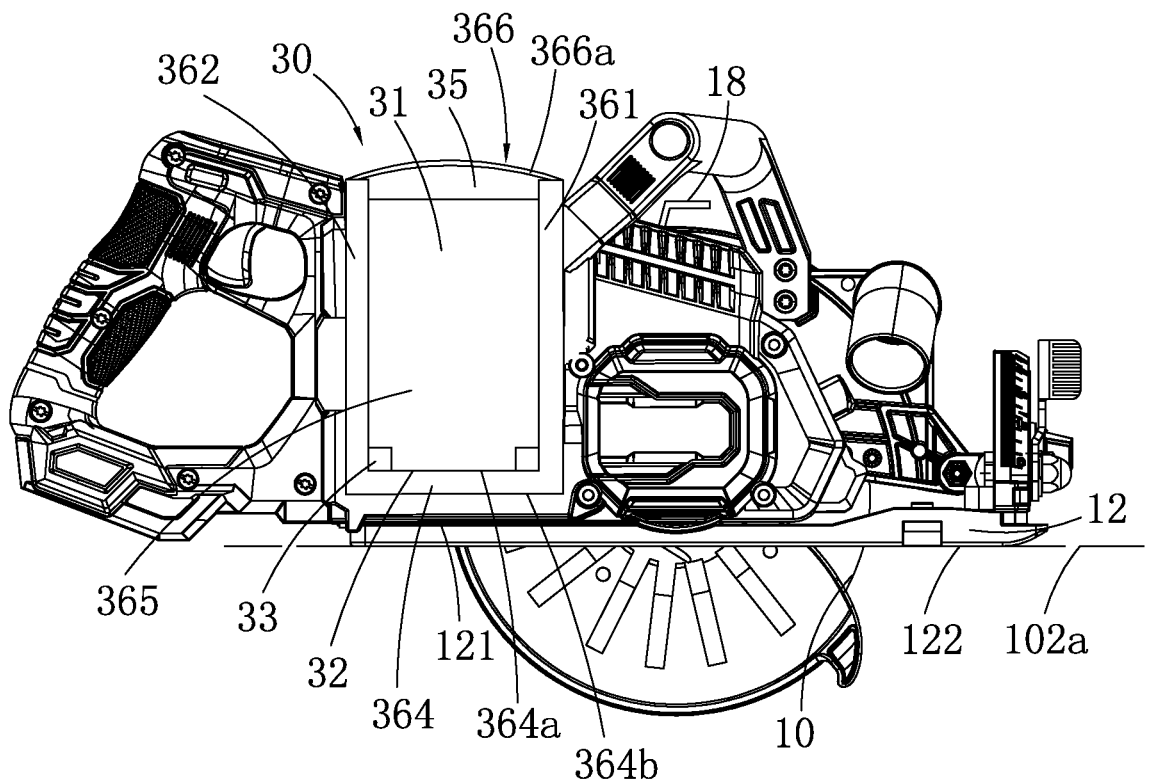
FIG. 37 is a right view of a cutting tool according to another example of the present application.
Figure 38:
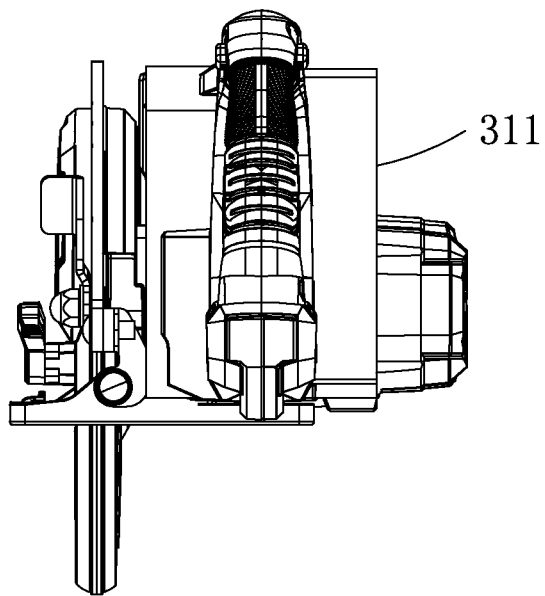
FIG. 38 is a rear view of the cutting tool in FIG. 37.

Technical solutions of another example are described below. Parts of this example the same as or corresponding to those of the preceding examples use the corresponding reference numerals in the preceding examples. A cutting tool 100 in this example has a drive device 11, a base plate 12, a body 20, and a handle 13 with substantially the same structures as those in the preceding examples. For simplicity, only differences between this example and example one are described. As shown in FIGS. 37 and 38, this example differs from example one mainly in that a mounting surface 32 is configured below a battery set 90.

In this example, a junction portion 30 includes an opening portion 311 for the battery set 90 to enter a battery compartment 31. The opening portion 311 opens in a direction away from a saw blade 10 in the left and right direction. The junction portion 30 also includes the mounting surface 32 and a guide mechanism 33. The mounting surface 32 extends substantially parallel to the base plate 12 and is configured below the battery set 90. A lower surface 122 is defined as a second plane 102a, and a projection of the battery set 90 on the second plane 102a at least partially overlaps a projection of the mounting surface 32 on the second plane 102a. The guide mechanism 33 extends on the mounting surface 32 and is configured to engage with the battery set 90. When a user mounts the battery set 90 to the junction portion 30, the battery set 90 moves towards the saw blade 10 from away from the saw blade 10 and enters the battery compartment 31 through the opening portion 311. The junction portion 30 includes a window portion 35 opening upward. In this example, the mounting surface 32 is configured near the base plate 12. The distance between the mounting surface 32 and an upper surface 121 is greater than or equal to 10 mm and less than or equal to 40 mm. The mounting surface 32 is disposed below the battery set 90, thereby facilitating the downward configuration of the center of gravity of the cutting tool 100 and improving the overall stability of the cutting tool 100. The mounting surface 32 is substantially parallel to the base plate 12 so that it is convenient for the battery set 90 to be mounted horizontally to the junction portion 30, thereby increasing the mounting stability of the battery set 90. The mounting surface 32 is configured near the base plate 12 so that the junction portion 30 fully utilizes the space above the base plate 12, the structure is compact, and the adaptation of battery sets 90 with different dimensions is facilitated. The junction portion 30 includes the opening portion 311 and the window portion 35, and the battery set 90 can be mounted in a state of protruding from the opening portion 311 in the left and right direction and protruding from the window portion 35 in the up and down direction so that the user can conveniently mount the battery sets 90 with different dimensions to the junction portion 30.

The junction portion 30 includes a front wall 361, a rear wall 362, and a lower wall 364. The front wall 361 is configured in the front of the junction portion 30. The rear wall 362 is configured in the rear of the junction portion 30, and the rear wall 362 is behind the front wall 361. The lower wall 364 is configured at the bottom of the junction portion 30, and at least part of the lower wall 364 is disposed between the front wall 361 and the rear wall 362 in the front and rear direction. The front wall 361, the rear wall 362, and the lower wall 364 extend in the direction away from the saw blade 10 in the left and right direction. The front wall 361, the rear wall 362, and the lower wall 364 together define the opening portion 311. When the cutting tool 100 is observed from the right, the front wall 361, the rear wall 362, and the lower wall 364 substantially form a U shape. The lower wall 364 includes an upper wall surface 364*a* and a lower wall surface 364*b*, and the mounting surface 32 is formed on the upper wall surface 364*a*. The junction portion 30 further includes a left wall 365 configured on the left of the junction portion 30. At least part of the left wall 365 is disposed between the front wall 361 and the rear wall 362 in the front and rear direction, and at least part of the left wall 365 is disposed above the lower wall 364 in the up and down direction. The front wall 361, the rear wall 362, and the left wall 365 extend substantially perpendicularly to the second plane 102*a*, and the lower wall 364 extends substantially parallel to the second plane 102*a*. The front wall 361 is substantially parallel to the rear wall 362, and the lower wall 364 is substantially perpendicular to the front wall 361, the rear wall 362, and the left wall 365.

The junction portion 30 further includes a reinforcement mechanism 366 configured to increase the strength of the junction portion 30. In this example, the reinforcement mechanism 366 includes a reinforcement rib 366*a* configured at the top of the junction portion 30. In other examples, the reinforcement rib 366*a* may be integrally formed with the secondary handle 14 and extend to the junction portion 30. The cutting tool 100 also includes a hook 18 configured to hang the cutting tool 100 to a support structure. The support structure includes a beam, a hook, a rope, a waistband, a nail, a ring, a latch, a pocket, and the like. In this example, the hook 18 is mounted on the body 20 and disposed on the upper side of the body 20.

Figure 39:
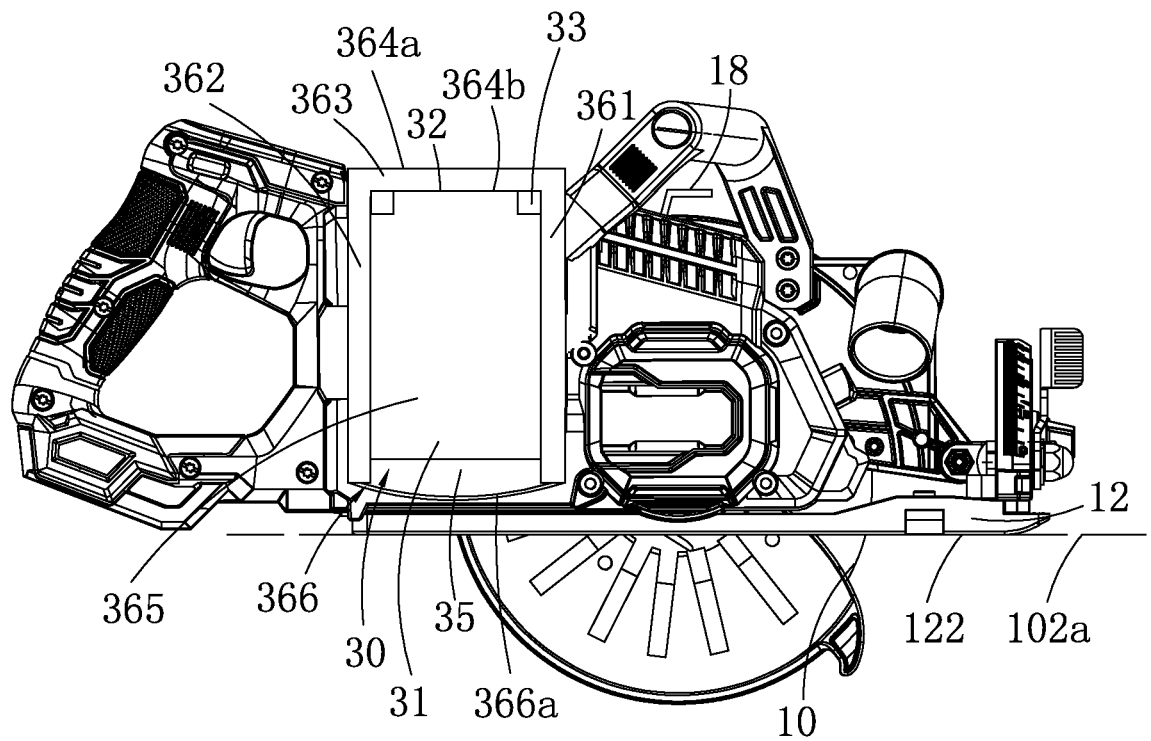
FIG. 39 is a right view of a cutting tool according to another example of the present application.
Figure 40:
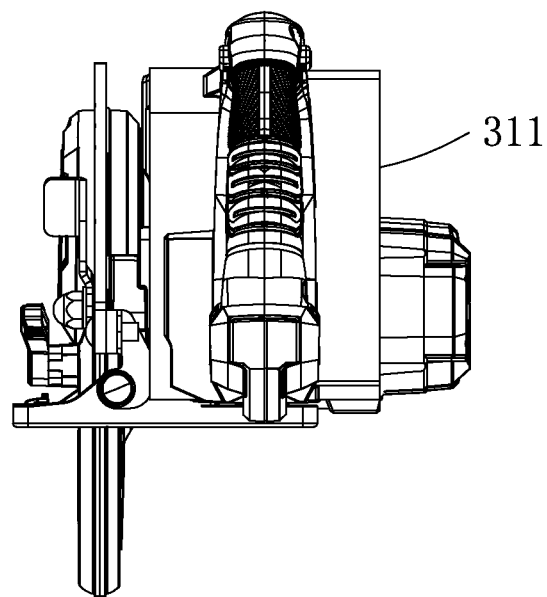
FIG. 40 is a rear view of the cutting tool in FIG. 39.

Technical solutions of another example are described below. Parts of this example the same as or corresponding to those of the preceding examples use the corresponding reference numerals in the preceding examples. A cutting tool 100 in this example has a drive device 11, a base plate 12, a body 20, and a handle 13 with substantially the same structures as those in the preceding examples. For simplicity, only differences between this example and example one are described. As shown in FIGS. 39 and 40, this example differs from example one mainly in that a mounting surface 32 is configured above a battery set 90.

In this example, a junction portion 30 includes an opening portion 311 for the battery set 90 to enter a battery compartment 31. The opening portion 311 opens in a direction away from a saw blade 10 in the left and right direction. The junction portion 30 also includes the mounting surface 32 and a guide mechanism 33. The mounting surface 32 extends substantially parallel to the base plate 12 and is configured above the battery set 90. The junction portion 30 includes a window portion 35 opening downward. The junction portion 30 includes a front wall 361, a rear wall 362, and an upper wall 363. The front wall 361 is configured in the front of the junction portion 30. The rear wall 362 is configured in the rear of the junction portion 30, and the rear wall 362 is behind the front wall 361. The upper wall 363 is configured at the top of the junction portion 30, and at least part of the upper wall 363 is disposed between the front wall 361 and the rear wall 362 in the front and rear direction. The front wall 361, the rear wall 362, and the upper wall 363 extend in the direction away from the saw blade 10 in the left and right direction. The front wall 361, the rear wall 362, and the upper wall 363 together define the opening portion 311. The upper wall 363 includes an upper wall surface 364*a* and a lower wall surface 364*b*, and the mounting surface 32 is formed on the lower wall surface 364*b*. The junction portion 30 further includes a left wall 365 configured on the left of the junction portion 30. At least part of the left wall 365 is disposed between the front wall 361 and the rear wall 362 in the front and rear direction, and at least part of the left wall 365 is disposed below the upper wall 363 in the up and down direction. The front wall 361, the rear wall 362, and the left wall 365 extend substantially perpendicularly to a second plane 102*a*, and the upper wall 363 extends substantially parallel to the second plane 102*a*. The front wall 361 is substantially parallel to the rear wall 362, and the upper wall 363 is substantially perpendicular to the front wall 361, the rear wall 362, and the left wall 365. The junction portion 30 further includes a reinforcement mechanism 366 configured to increase the strength of the junction portion 30. In this example, the reinforcement mechanism 366 includes a reinforcement rib 366*a* configured at the bottom of the junction portion 30.

Figure 41:
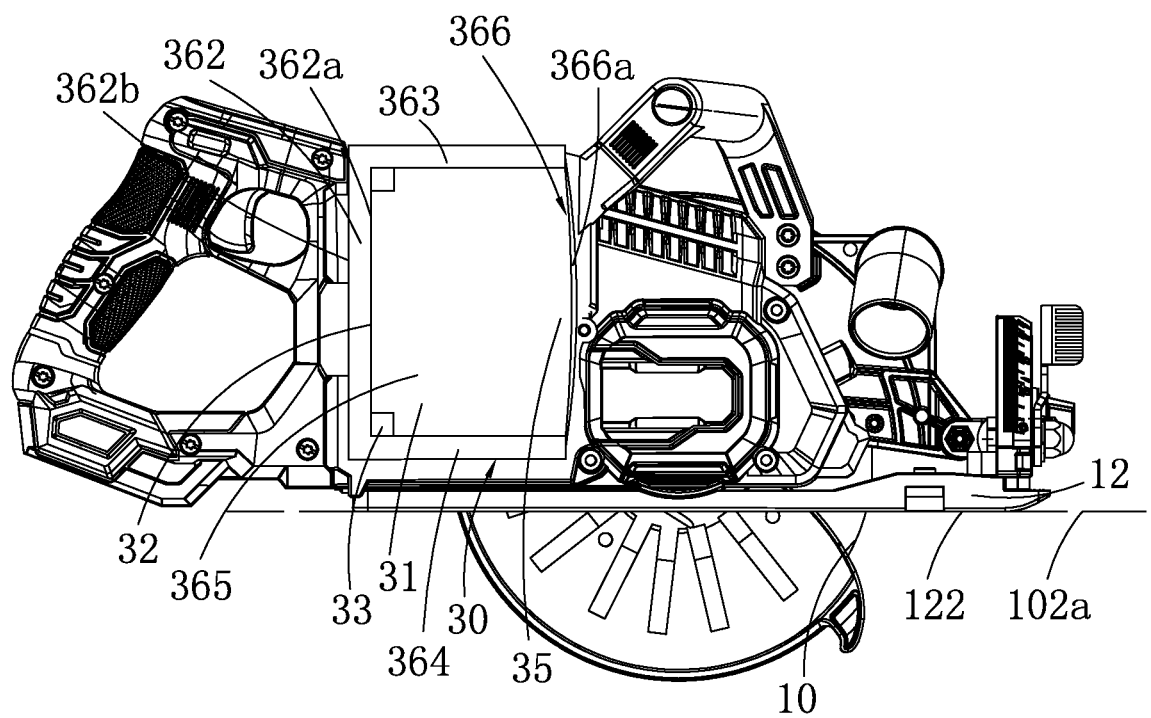
FIG. 41 is a right view of a cutting tool according to another example of the present application.
Figure 42:
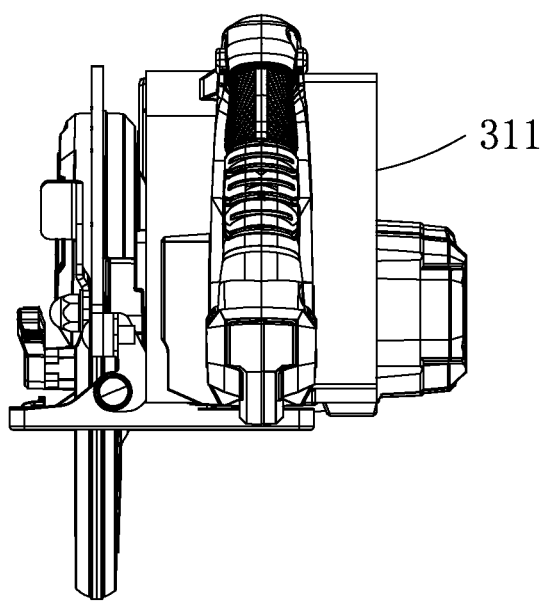
FIG. 42 is a rear view of the cutting tool in FIG. 41.

Technical solutions of another example are described below. Parts of this example the same as or corresponding to those of the preceding examples use the corresponding reference numerals in the preceding examples. A cutting tool 100 in this example has a drive device 11, a base plate 12, a body 20, and a handle 13 with substantially the same structures as those in the preceding examples. For simplicity, only differences between this example and example one are described. As shown in FIGS. 41 and 42, this example differs from example one mainly in that a mounting surface 32 is configured behind a battery set 90.

In this example, a junction portion 30 includes an opening portion 311 for the battery set 90 to enter a battery compartment 31. The opening portion 311 opens in a direction away from a saw blade 10 in the left and right direction. The junction portion 30 also includes the mounting surface 32 and a guide mechanism 33. The mounting surface 32 extends substantially perpendicularly to the base plate 12 and is configured behind the battery set 90. The junction portion 30 includes a window portion 35 opening forward. The junction portion 30 includes an upper wall 363, a lower wall 364, and a rear wall 362.

The upper wall 363 is configured at the top of the junction portion 30. The lower wall 364 is configured at the bottom of the junction portion 30, and the lower wall 364 is below the upper wall 363. The rear wall 362 is configured in the rear of the junction portion 30, and at least part of the rear wall 362 is disposed between the upper wall 363 and the lower wall 364 in the up and down direction. The upper wall 363, the lower wall 364, and the rear wall 362 extend in the direction away from the saw blade 10 in the left and right direction. The upper wall 363, the lower wall 364, and the rear wall 362 together define the opening portion 311. When the cutting tool 100 is observed from the right, the upper wall 363, the lower wall 364, and the rear wall 362 substantially form a C shape. The rear wall 362 includes a rear wall surface 362*b* and a front wall surface 362*a*, and the mounting surface 32 is formed on the front wall surface 362*a*. The junction portion 30 further includes a left wall 365 configured on the left of the junction portion 30. At least part of the left wall 365 is disposed between the upper wall 363 and the lower wall 364 in the up and down direction, and at least part of the left wall 365 is disposed in front of the rear wall 362 in the front and rear direction. The upper wall 363 and the lower wall 364 extend substantially parallel to a second plane 102*a*, and the rear wall 362 extends substantially perpendicularly to the second plane 102a. The upper wall 363 is substantially parallel to the lower wall 364, and the rear wall 362 is substantially perpendicular to the upper wall 363, the lower wall 364, and the left wall 365. The junction portion 30 further includes a reinforcement mechanism 366 configured to increase the strength of the junction portion 30. In this example, the reinforcement mechanism 366 includes a reinforcement rib 366a configured in the front of the junction portion 30.

Figure 43:
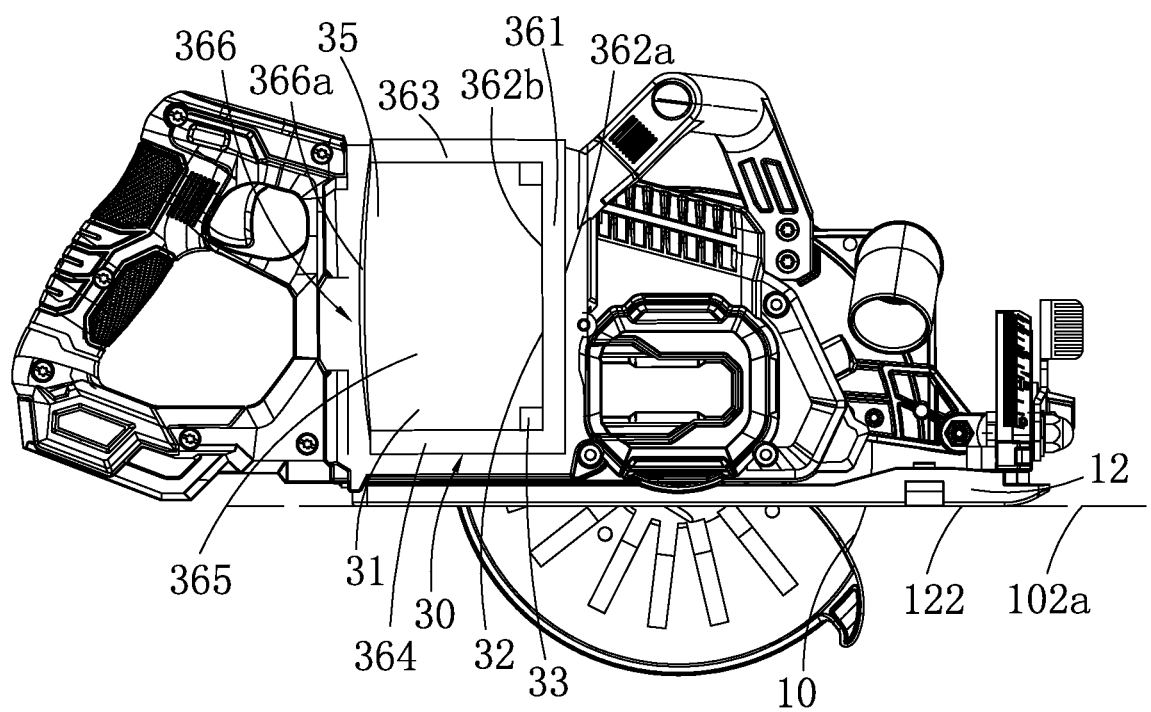
FIG. 43 is a right view of a cutting tool according to another example of the present application.
Figure 44:
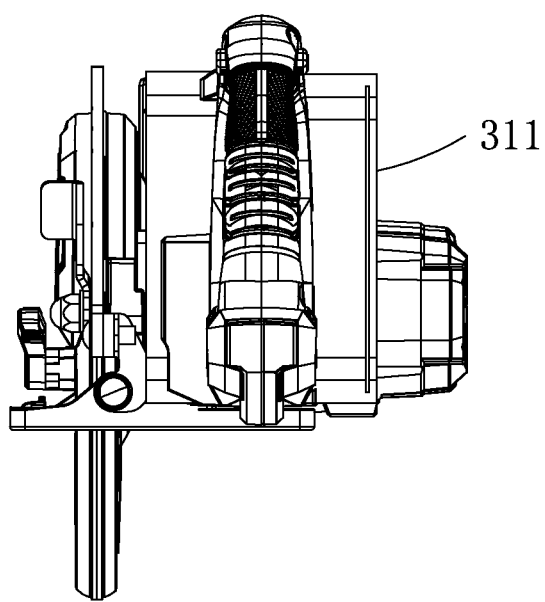
FIG. 44 is a rear view of the cutting tool in FIG. 43.

Technical solutions of another example are described below. Parts of this example the same as or corresponding to those of the preceding examples use the corresponding reference numerals in the preceding examples. A cutting tool 100 in this example has a drive device 11, a base plate 12, a body 20, and a handle 13 with substantially the same structures as those in the preceding examples. For simplicity, only differences between this example and example one are described. As shown in FIGS. 43 and 44, this example differs from example one mainly in that a mounting surface 32 is configured in front of a battery set 90.

In this example, a junction portion 30 includes an opening portion 311 for the battery set 90 to enter a battery compartment 31. The opening portion 311 opens in a direction away from a saw blade 10 in the left and right direction. The junction portion 30 also includes the mounting surface 32 and a guide mechanism 33. The mounting surface 32 extends substantially perpendicularly to the base plate 12 and is configured in front of the battery set 90. The junction portion 30 includes a window portion 35 opening rearward. The junction portion 30 includes an upper wall 363, a lower wall 364, and a front wall 361.

The upper wall 363 is configured at the top of the junction portion 30. The lower wall 364 is configured at the bottom of the junction portion 30, and the lower wall 364 is below the upper wall 363. The front wall 361 is configured in the front of the junction portion 30, and at least part of the front wall 361 is disposed between the upper wall 363 and the lower wall 364 in the up and down direction. The upper wall 363, the lower wall 364, and the front wall 361 extend in the direction away from the saw blade 10 in the left and right direction. The upper wall 363, the lower wall 364, and the front wall 361 together define the opening portion 311. The front wall 361 includes a front wall surface 362a and a rear wall surface 362b, and the mounting surface 32 is formed on the rear wall surface 362b. The junction portion 30 further includes a left wall 365 configured on the left of the junction portion 30. At least part of the left wall 365 is disposed between the upper wall 363 and the lower wall 364 in the up and down direction, and at least part of the left wall 365 is disposed behind the front wall 361 in the front and rear direction. The upper wall 363 and the lower wall 364 extend substantially parallel to a second plane 102a, and the front wall 361 extends substantially perpendicularly to the second plane 102a. The upper wall 363 is substantially parallel to the lower wall 364, and the front wall 361 is substantially perpendicular to the upper wall 363, the lower wall 364, and the left wall 365.

The junction portion 30 further includes a reinforcement mechanism 366 configured to increase the strength of the junction portion 30. In this example, the reinforcement mechanism 366 includes a reinforcement rib 366a configured in the rear of the junction portion 30.

Figure 45:
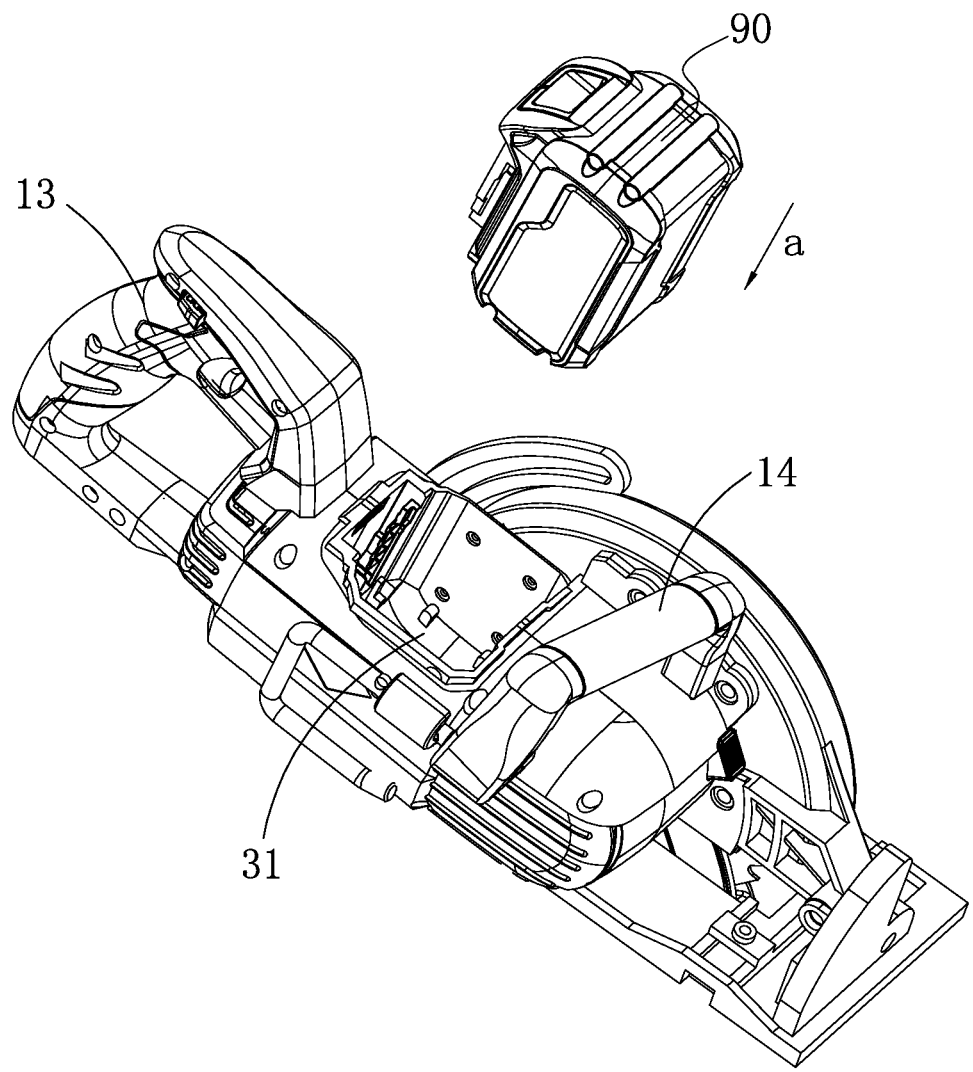
FIG. 45 is a perspective view of a cutting tool according to another example of the present application.
Figure 46:
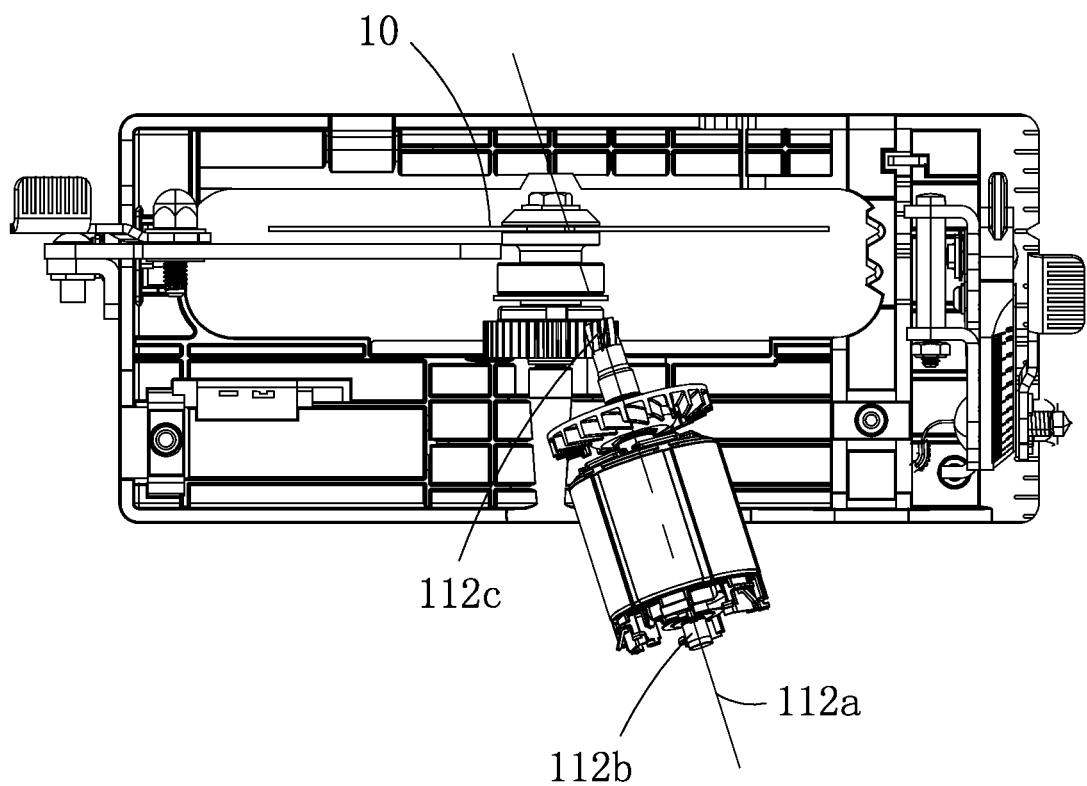
FIG. 46 is a top view of an electric motor and a base plate of the cutting tool in FIG. 45.

Technical solutions of another example are described below. Parts of this example the same as or corresponding to those of the preceding examples use the corresponding reference numerals in the preceding examples. A cutting tool 100 in this example has a drive device 11, a base plate 12, a body 20, and a handle 13 with substantially the same structures as those in the preceding examples. For simplicity, only differences between this example and example one are described. As shown in FIGS. 45 and 46, this example differs from example one mainly in that a motor shaft 112 is obliquely disposed, and a battery set 90 is disposed between the handle 13 and a secondary handle 14 in the front and rear direction. The battery set 90 includes one battery pack. The battery pack is inserted into a battery compartment 31 from top to bottom in a direction a. The motor shaft 112 extends substantially along a straight line 112a, and the motor shaft 112 has a first end 112b and a second end 112c in a length direction. The second end 112c is used for outputting power to a saw blade 10. The second end 112c is an output end of the motor shaft 112 and also an end facing the saw blade 10. The distance from the first end 112b to the saw blade 10 is smaller than the sum of the distance from the second end 112c to the saw blade 10 and the length of the motor shaft 112. In some examples, the first end 112b is further away from the saw blade 10 than the second end 112c in the left and right direction. The second end 112c is disposed on the lower side of the first end 112b in the up and down direction. In this manner, the cutting tool 100 is more compact in structure.

The basic principles, main features, and advantages of the present application are shown and described above. It is to be understood by those skilled in the art that the preceding examples do not limit the present application in any form, and all technical solutions obtained through equivalent substitutions or equivalent transformations fall within the scope of the present application.

What is claimed is:

1. A cutting tool, comprising:
a drive device comprising a battery powered, electric motor for driving a saw blade to rotate;
a base plate having an opening through which passes the saw blade, an upper surface, and a lower surface, wherein the lower surface is configured to abut against a cut material;
a body, comprising a motor housing accommodating at least part of the drive device, a first shield covering a portion of the saw blade that is disposed above the upper surface of the base plate, and a second shield rotatable to cover a portion of the saw blade that extends below the lower surface of the base plate;
a handle;
a depth adjustment device that is fixedly connected to the handle, that couples the body to the base plate, and that allows the body to be moved relative to the handle and the base plate together about a first axis to control an amount of the saw blade that extends below the lower surface of the base plate; and
an angle adjustment device that couples the body to the base plate and that allows the handle and the body to be moved together relative to the base plate about a second axis to control an angle of the saw blade relative to the base plate.

2. The cutting tool of claim 1, wherein the depth adjustment device comprises a locking assembly disposed on a side of the handle facing the saw blade, the locking assembly preventing movement about the first axis.

3. The cutting tool of claim 1, wherein the bracket comprises an extension extending substantially parallel to the base plate in a front and rear direction.

4. The cutting tool of claim 1, comprising a circuit board, wherein the handle is formed with an accommodation compartment in which at least part of the circuit board is configured substantially parallel to the base plate.

5. The cutting tool of claim 4, wherein the bracket is constructed from a metal material and engages with the circuit board.

6. The cutting tool of claim 1, comprising a wire configured to conduct electricity and further comprising a guide member for guiding at least part of the wire to move and a guide slot mating with the guide member, wherein the guide member covers at least part of the wire.

7. The cutting tool of claim 1, wherein a difference between a height of a space occupied by the cutting tool when a maximum amount of the saw blade extends below the lower surface of the base plate and a height of a space occupied by the cutting tool when a minimum amount of the saw blade extends below the lower surface of the base plate is defined as an overall height difference, the cutting tool has a center of gravity, a difference between a height of the center of gravity of the cutting tool when the maximum amount of the saw blade extends below the lower surface of the base plate and a height of the center of gravity of the cutting tool when the minimum amount of the saw blade extends below the lower surface of the base plate is defined as a gravity height difference, and a ratio of the overall height difference to the gravity height difference is greater than or equal to 1.

8. The cutting tool of claim 1, wherein the handle comprises a grip for a user to hold, the grip extends substantially along a straight line, and an angle between the straight line and a horizontal plane is less than or equal to 45°.

9. A cutting tool, comprising:
a drive device comprising a battery powered, electric motor for driving a saw blade to rotate;
a base plate having an opening through which passes the saw blade, an upper surface, and a lower surface, wherein the lower surface is configured to abut against a cut material;
a body, comprising a motor housing accommodating at least part of the drive device, a first shield covering a portion of the saw blade that is disposed above the upper surface of the base plate, and a second shield rotatable to cover a portion of the saw blade that extends below the lower surface of the base plate;
a handle having a trigger, the trigger operable to control the drive device;
a depth adjustment device that is fixedly connected to the handle, that couples the body to the base plate, and that allows the body to be moved relative to the handle and the base plate together about a first axis to control an amount of the saw blade that extends below the lower surface of the base plate; and
an angle adjustment device that couples the body to the base plate and that allows the handle and the body to be moved together relative to the base plate about a second axis to control an angle of the saw blade relative to the base plate.

10. A cutting tool, comprising:
a drive device comprising a battery powered, electric motor for driving a saw blade to rotate;
a base plate having an opening through which passes the saw blade, an upper surface, and a lower surface, wherein the lower surface is configured to abut against a cut material;
a body, comprising a motor housing accommodating at least part of the drive device, a first shield covering a portion of the saw blade that is disposed above the upper surface of the base plate, and a second shield rotatable to cover a portion of the saw blade that extends below the lower surface of the base plate;
a handle having an interface that couples to a battery pack;
a depth adjustment device that is fixedly connected to the handle, that couples the body to the base plate, and that allows the body to be moved relative to the handle and the base plate together about a first axis to control an amount of the saw blade that extends below the lower surface of the base plate; and
an angle adjustment device that couples the body to the base plate and that allows the handle and the body to be moved together relative to the base plate about a second axis to control an angle of the saw blade relative to the base plate.

* * * * *